US012593090B2

(12) United States Patent
Suryavanshi

(10) Patent No.: US 12,593,090 B2
(45) Date of Patent: Mar. 31, 2026

(54) GEOFENCING FOR MEDIA CONTENT PRESENTED ON A TRANSPORT CRAFT

(71) Applicant: VIASAT, INC., Carlsbad, CA (US)

(72) Inventor: Vijay A. Suryavanshi, Mumbai (IN)

(73) Assignee: VIASAT, INC., Carlsbad, CA (US)

( * ) Notice: Subject to any disclaimer, the term of this patent is extended or adjusted under 35 U.S.C. 154(b) by 26 days.

(21) Appl. No.: 18/731,067

(22) Filed: May 31, 2024

(65) Prior Publication Data

US 2024/0323466 A1 Sep. 26, 2024

Related U.S. Application Data

(63) Continuation of application No. PCT/US2021/061468, filed on Dec. 1, 2021.

(51) Int. Cl.
| | |
|---|---|
| *H04N 21/254* | (2011.01) |
| *H04N 21/214* | (2011.01) |
| *H04N 21/24* | (2011.01) |
| *H04N 21/266* | (2011.01) |

(52) U.S. Cl.
CPC ..... *H04N 21/2541* (2013.01); *H04N 21/2146* (2013.01); *H04N 21/24* (2013.01); *H04N 21/266* (2013.01)

(58) Field of Classification Search
CPC ........... H04N 21/2541; H04N 21/2146; H04N 21/24; H04N 21/266
See application file for complete search history.

(56) References Cited

U.S. PATENT DOCUMENTS

| | | | | |
|---|---|---|---|---|
| 2013/0074112 A1* | 3/2013 | Hyde | ................. | H04N 21/2146 |
| | | | | 725/25 |
| 2015/0245109 A1* | 8/2015 | Couleaud | ......... | H04N 21/26291 |
| | | | | 725/77 |
| 2017/0223080 A1* | 8/2017 | Velayudhan | .......... | H04L 65/612 |
| 2017/0289757 A1* | 10/2017 | Kong | .................... | H04W 4/022 |
| 2021/0136518 A1* | 5/2021 | Borras | ................... | H04W 4/20 |

FOREIGN PATENT DOCUMENTS

| | | |
|---|---|---|
| JP | 2004297423 A | 10/2004 |
| JP | 2019066926 A | 4/2019 |
| WO | 2021002857 A1 | 1/2021 |

OTHER PUBLICATIONS

International Search Report completed by the European Patent Office on Jul. 11, 2022 for application PCT/US2021/061468.

* cited by examiner

*Primary Examiner* — Mulugeta Mengesha
(74) *Attorney, Agent, or Firm* — HOLZER PATEL DRENNAN

(57) ABSTRACT

A method of controlling media content provided to an on-board media system in a transport craft is provided The method includes receiving data representing a location of the transport craft from a location system of the transport craft, providing, by an on-board content management system including a geofence monitor, the media content, the providing including. The operation of providing includes determining the media content the on-board media system provides based on a determination of whether the transport craft satisfies a geofence condition, the satisfaction of the geofence condition based on the received data representing the location of the transport craft and instructing the on-board media system to provide determined media content.

46 Claims, 10 Drawing Sheets

Figure 6:
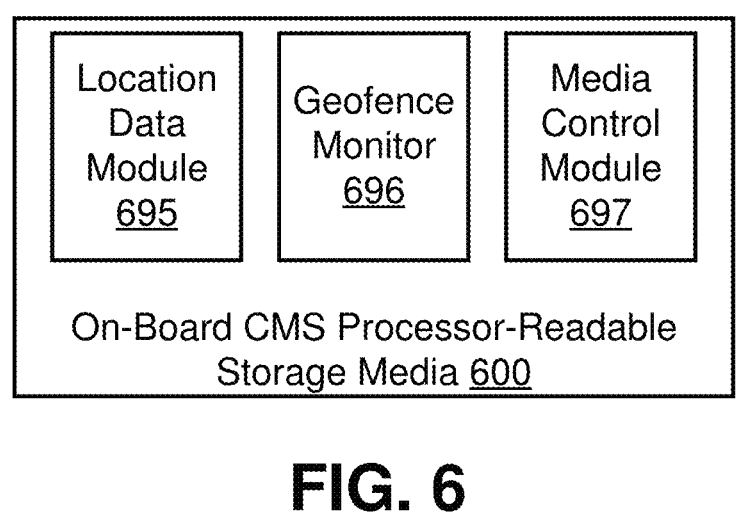

| Location Data Module 695 | Geofence Monitor 696 | Media Control Module 697 |

On-Board CMS Processor-Readable Storage Media 600

702 — Receive Data Representing A Location Of A Passenger Craft

704 — Determine Media Content To Provide Based On A Condition Associated With A Geofence 706 — Provide The Determined Media Content

800

802 — Receive Geographic Data Representing A Path Of A Transport Craft

804 — Determine Whether The Path Satisfies A Geofence Activation Condition

806 — Activate The Geofence Monitor Responsive To Satisfaction Of The Geofence Activation Condition

900

902 — Receive Data Representing The Location Of A Transport Craft

904 — Determine When A Transport Craft Will Cross A Geofenced Area Boundary

906 — Acting Responsive To Determining When The Transport Craft Will Cross The Geofenced Area Boundary

GEOFENCING FOR MEDIA CONTENT PRESENTED ON A TRANSPORT CRAFT

CROSS-REFERENCE TO RELATED APPLICATIONS

The present application is a continuation-in-part of International Application PCT/US2021/061468, entitled "GEOFENCING FOR MEDIA CONTENT PRESENTED ON A TRANSPORT CRAFT," filed on Dec. 1, 2021, which is specifically incorporated by reference for all that it discloses or teaches.

BACKGROUND

Transport crafts often provide entertainment to passengers during transit. The entertainment may come in the form of pre-positioned or prerecorded content and/or may include live entertainment. The provision of live or prerecorded content can present difficulties, as many content feeds have associated geographically limited rights that require licenses. Even if licenses are acquired, the licenses may be limited by parameters, including geographic parameters. Some systems abandon content having such rights restrictions altogether under certain circumstances in order to avoid licensing issues.

SUMMARY

The described technology provides implementations of methods of and systems for controlling media content provided to an on-board media system in a transport craft. The method includes receiving data representing a location of the transport craft from a location system of the transport craft and providing, by an on-board content management system including a geofence monitor, the media content. The providing includes determining the media content the on-board media system provides based on a determination of whether the transport craft satisfies a geofence condition, the satisfaction of the geofence condition based on the received data representing the location of the transport craft and instructing the on-board media system to provide determined media content.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 6 illustrates an exemplary implementation of on-board content management system processor-readable storage media.

DETAILED DESCRIPTIONS

Figure 1:
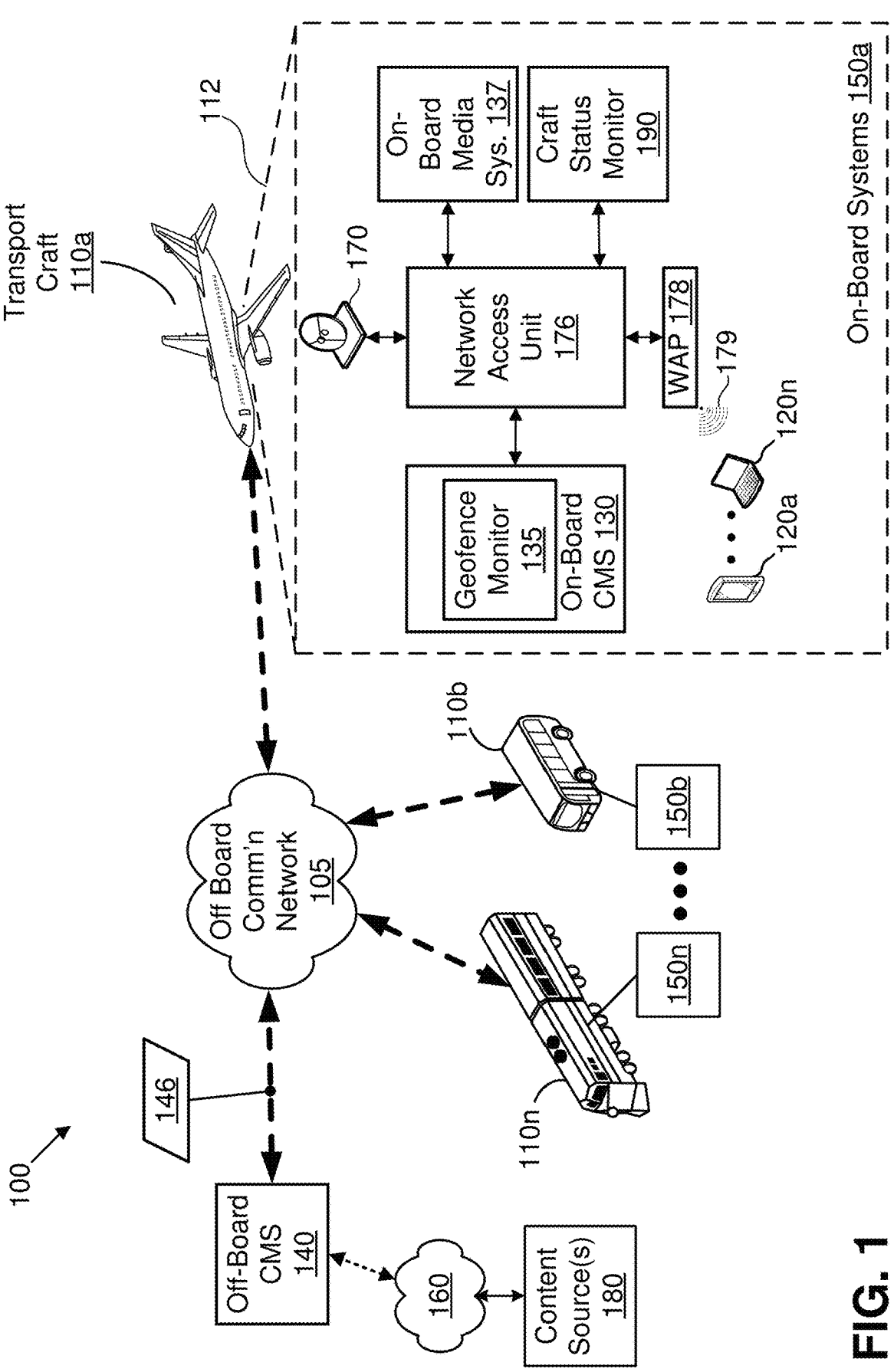
FIG. 1 illustrates an exemplary implementation of a geofence system for providing media on a transport craft.

Providing entertainment that is subject to rights restrictions (e.g., a license) can be problematic in a traveling transport craft. The transport craft may cross geographic borders that define the scope of licenses to provide access to certain content. For example, this can be particularly problematic in live video streaming, as many live broadcasts are licensed to different entities in different geographic locations. These licenses may be complicated and directed to one or more of the media itself, the local or global provider of the media, the circumstances under which the media is provided, and the like. In some circumstances, transport crafts will remove access to rights restricted entirely, even in regions where the access is allowed, in order to avoid the likelihood that the craft will continue to provide the restricted media when the transport craft is no longer authorized to provide the media.

For example, in flights with an origin in a first geographic licensing region and destination in a second geographic licensing region, a transport craft may elect to not provide any live media access to offerings for which the carrier or a responsible third party is only licensed within the first geographic licensing region. This may unnecessarily limit the media offerings the transport craft can provide to the passengers when in the first geographical licensing region. While this may offer a conservative way to comply with licenses, other methods can be employed to provide a better experience to passengers while assuring that the media offered on the transport craft does not violate any licenses or intellectual property rights.

In an implementation, an on-board media system of a transport craft can be communicatively coupled to an on-board content management system (CMS). The on-board CMS may be controlled and/or owned by the transport craft carrier or may be owned and/or controlled by a third party. The on-board CMS may include a geofence monitor that determines which content is transmitted to the on-board media system (e.g., for subsequent distribution to client devices aboard the transport craft). The geofence monitor may be operable to restrict content provided by the on-board CMS to the on-board media system based on a set of predefined rules. The predefined rules may be based on licensing and geographical limitations of licenses.

The on-board CMS may control the media content provided based on geographical data generated and/or received by the transport craft. The geographical data may include positional data associated with the transport craft. The on-board CMS may be in communication with an off-board CMS, which may be located remotely from the transport craft. Any determinations based on one or more of geofence data, satisfaction of predefined rules or conditions, data representing the location of the transport craft, and media to be provided by the on-board CMS to the on-board media system may be conducted solely by one of the on-board CMS and off-board CMS or may be distributed between the on-board CMS and off-board CMS. For example, determinations regarding one or more of geofences, geofence conditions, media content to be provided, geofence activation conditions, distance or timing conditions, licensing conditions, conditions under which media content is to be provided, modified conditions, crossing timing conditions, and passenger/client device conditions can be distributed in any manner between the on-board CMS and the off-board CMS.

The on-board CMS may provide media content to the on-board media system. This operation of providing may include transmitting the media content to the on-board media system and/or allowing the media content to be transmitted by the on-board media system to passenger/client devices. A determination to provide the media content to the on-board media system may be based on satisfaction of a geofence condition.

A geofence may be a data representation of a geographic location. The geofence may contain a geofenced area for which the geofence represents a geographic boundary. The geofenced area may be a geographic area. The geofence may be represented in any number of ways including by geographical points, known geographical regions, or other predefined geographical areas. In implementations where geofences are represented by points, the points may be sets of geographic coordinates. For example, the geofence may be comprised of series of associated sets or tuples including longitude and latitude values. In implementations, the geofence can conform to any number of shapes. For example, the geofence may have boundaries with properties of one or more of a polygon, a curvilinear shape, a circle (e.g., defined by a radius or diameter and a center), a triangle, and the like. The geofence may also be defined by or based on existing geographic borders such as one or more of countries, cities, counties, states, territories, local regions, regions defined by media content licensing agreements, or regions defined by other legal restrictions (e.g., regions where certain types of media content are forbidden).

The geofence may also be specific to certain media and may be stored as data with association to data representing the media. For example, a particular live streaming media event (e.g., a live basketball game broadcast) may have different distribution and licensing rights within a specific geographic region than a different live streaming media event (e.g., a royal wedding). The associations with the geofence data may be based on one or more of a particular media event, a type of media content, a media content provider (e.g., an entertainment network or channel or a particular type of media application), a channel, specific suppliers of media content to the transport craft, and the like.

The on-board CMS may need to facilitate a change in media content provision permissions when the transport craft approaches and/or crosses a geofence boundary. In an implementation, each geofence may have a reduced geofence that is smaller than the geofence and is contained within the geofence. The reduced geofence may use data representing the position of the craft to predict when the transport craft will cross the geofence. Certain actions can be taken in response to this including transmitting an instruction to the on-board media system to warn passengers that content will not be available in a predicted or predefined amount of time or to inform the passenger that new conditions must be agreed to (e.g., additional payment) for media content for which the conditions of providing the media content change based on a geofence.

Using the geofence data to control the manner in which media content is provided to an on-board media system can provide significant advantages. For example, the transport craft can provide media content that should be terminated when the transport craft leaves or enters a particular area until that area is left or entered. Further, with such active control of media content relative to geographic location, sophisticated licensing structures can provide more customized content for different passengers in different regions, even when the media content will be restricted for part of the journey.

FIG. 1 illustrates an exemplary implementation of a geofence system 100 for providing media on a transport craft. As described herein, implementations operating in such a geofence system 100 can facilitate dynamic, in-transit delivery of media content to passenger/client devices 120 disposed on mobile transport craft 110. The transport craft 110 can include any suitable passenger transport craft, such as airplanes, trains, buses, cruise ships, etc. (illustrated individually as 110*a-n*). Passenger/client devices 120 can include personal mobile devices, such as smart phones, laptop computers, tablet computers, and the like; devices installed in the transport craft 110, such as seat-back media displays, shared cabin media displays, and the like; and/or any suitable device by which a passenger can consume media while in transit.

Media content to be provided can include broadcast "live" media content (e.g., substantially in real time except with respect to traditional transmission and buffering delays, as opposed to on-demand, or the like), for example, live content (i.e., content being broadcast substantially contemporaneously with the recording of that content, such as with live sporting or political events, etc.), first-run content (e.g., first showings of new television program episodes, prerecorded events, etc.), re-run content (e.g., second or subsequent showings of television program episodes, showings of movies previously released in other formats, etc.), advertisements, and/or any other suitable content. The term "broadcast channel" is used herein to generally refer to any media channel not produced dynamically on the transport craft 110, regardless of whether the channel is communicated via a broadcast format and/or protocol. For example, as used herein, a broadcast channel can be communicated (fully or partially) via over-the-air analog or digital broadcast, as an Internet protocol television (IPTV) stream, and/or in any other suitable manner.

Conventionally, receipt of such a broadcast channel by a transport craft 110 while in transit can involve establishing and maintaining a persistent connection with a source of a digital media stream over a communications network and streaming large amounts of data over a long period of time via the persistent connection. Different media content offerings may be subject to different licensing and legal limitations depending on the location of a transport craft at any time. For these and other reasons, providers of in-transit media services to passengers (e.g., transportation services providers) typically limit broadcast channels as part of their in-transit media offerings. In certain transport crafts, the carriers may opt to provide no "live" media content at all if the departure and destination locations are in different geographic regions or countries where licensing or legal requirements differ. This can limit the extent to which the passenger has access to media content, even when the transport craft is in locations where there are no legal or licensing restrictions on the media content.

Media content is not limited to live content. For example, the media content may include prepositioned media content stored within the on-board systems 150 (e.g., in a database in the on-board media system 137 or the on-board CMS 130). Media content may also be other than video content. For example, the media content may include websites, web applications, remote access to remotely located computer systems, and the like. Similarly to video content, other media content may have licensing and other legal limitations in certain jurisdictions. For example, some applications may be illegal in certain regions. Also, accessing some applications in foreign jurisdictions can violate license terms with the relevant applications. These jurisdictions may be represented in geofence data to facilitate restricted usage of the media content in the represented jurisdictions.

As illustrated, each transport craft 110 can include on-board systems 150, and the geofence system 100 can include an off-board content management system (CMS) 140 in communication with the on-board media systems 150 (e.g., 150*a-n*) of the transport craft 110 via one or more off-board communications networks 105. While the on-board media system 150 streams data in association with media content, components of the on-board system 150 can obtain appropriate content for streaming.

Media content can include metadata, and components of the on-board systems 150 can identify properties and associations based on the metadata. For example, metadata can indicate a content title that corresponds to a live program, or a content type that is typically presented live (e.g., sports, news, etc.). As another example, the metadata may indicate a content segment title that is determined to be stored on-board the transport craft 110 (or is labeled in the metadata as stored on-board the transport craft 110). In some implementations, components of the on-board systems 150 can identify whether each media content offering is stored (or will be stored) on-board the transport craft 110 as prepositioned content or streamed from a live feed. The metadata for different media content may also store an association with geofence data that defines geographically relevant boundaries for providing the media content.

The off-board communications network(s) 105 can include any suitable communications links, such as satellite communications systems, air-to-ground communication systems, hybrid satellite and air-to-ground communications systems, cellular communications systems, etc. Typically, the off-board communications networks 105 include at least one long-range wireless communications link for enabling wireless communications with the transport craft 110 while the transport craft 110 are in transit. Each component in communication with the off-board communications network(s) 105 includes suitable hardware for enabling such communications. In some implementations, the off-board communications network 105 includes a satellite communications system; and the off-board CMS 140 and each instance of the on-board systems 150 includes a satellite antenna and other satellite hardware and software components to enable satellite communications. In other implementations, the off-board communications network 105 includes a cellular communications system; and the off-board CMS 140 and each on-board media system 150 includes a cellular antenna and other cellular hardware and software components to enable cellular communications.

Implementations of the on-board media system 150 include an off-board network interface subsystem 170, an on-board network access unit 176, an on-board media server 135, and an on-board CMS 130. Implementations of the off-board network interface subsystem 170 can facilitate communications, via the off-board communications network 105, with the off-board CMS 140. The off-board CMS 140 can effectively establish communications with the transport craft 110 (e.g., and/or the transport craft 110 can establish communications with the off-board CMS 140) via the off-board network interface subsystem 170. Such communications can be used for various purposes described herein, such as to stream broadcast channels, provide channel schedules (e.g., updates to channels schedules 138), provide instructions to components of the on-board media system 150, to provide geofence data (e.g., representing one or more of geofence boundaries, determinations based on a location of the craft and geofence boundaries, data representing a location of the transport craft, modifications to existing geofence data, and the like). Implementations of the off-board network interface subsystem 170 can be part of a two-way communication system 112 disposed on the transport craft 110 and can include various components to facilitate bidirectional communication with the off-board communications network 105.

In the illustrated implementation, the off-board network interface subsystem 170 includes an antenna system, transceiver, modem, and network access unit 176. For example, where the off-board communications network 105 includes a satellite communications network, the off-board network interface subsystem 170 can provide for reception of a forward downlink signal from a satellite and transmission of a return uplink signal to the satellite to support two-way data communications between components on the transport craft 110 and components remote from the transport craft 110 (e.g., between the on-board CMS 130 and the off-board CMS 140). In such contexts, the modem can generate modulated uplink data (e.g., a transmit intermediate frequency (IF) signal) for delivery to the transceiver, and the transceiver can upconvert and amplify the modulated uplink data to generate the return uplink signal for transmission to the satellite via the antenna system. Similarly, the transceiver can receive the forward downlink signal from the satellite via the antenna system, and the transceiver can amplify and down convert the forward downlink signal to generate modulated downlink data (e.g., a receive IF signal) for demodulation by the modem. The demodulated downlink data from the modem can be provided to the network access unit 176 for routing to the on-board CMS 130 and/or directly to passenger/client devices 120.

Implementations of the on-board network access unit 176 are disposed on the transport craft 110 and can communicate, via an on-board communications network 179, with passenger/client devices 120 disposed on the transport craft 110. The on-board network access unit 176 can also be part of the two-way communication system 112 disposed on the transport craft 110 and can include various components to facilitate bidirectional communication with the passenger/client devices 120 disposed on the transport craft 110 via an on-board communications network 179. In implementations, the network access unit 176 enables the on-board CMS 130 to communicate with both elements of the on-board systems 150 and the off-board network interface subsystem 170 and also enables direct communications in some implementations between the elements of the on-board systems 150 and the off-board network interface subsystem 170. The network access unit can also include any other suitable components to form the on-board communications network to facilitate communicative coupling of the passenger/client devices 120 with the network access unit 176. For example, while the on-board communications network is illustrated generally as a wireless link, the on-board communications network can include any suitable number and type of physical and/or logical ports, wired and/or wireless links, routers, switches, and/or other components. In some implementations, the network access unit 176 includes a wireless access point (WAP) 178 that can establish two-way wireless communications with passenger/client devices 120 through a wireless local area network (WLAN) or the like. One or more WAPs 178 can be distributed about the transport craft 110, and can, in conjunction with network access unit 176, provide traffic switching and routing functionality; for example, as part of a WLAN extended service set (ESS), etc. While several elements of the on-board systems 150 are illustrated as communicatively coupled by the network access unit 176 for simplicity, implementations are contemplated in which a number of different networks are used to couple the elements illustrated. The various components of the two-way communication system 112 can be implemented in any suitable manner. For example, while shown as separate components, in different implementations, some or all components may be integrated into a single component (e.g., the modem can be integrated with network access unit 176) or segmented into additional components.

Implementations of the on-board CMS 130 can be in communication with one or more of the off-board network interface subsystems 170, the on-board network access unit 176, a craft status monitor 190, and the on-board media system 137. While elements of the on-board systems 150 are illustrated as separate elements, one or more of the on-board systems 150 elements may be integrated. The on-board CMS 130 may include a geofence monitor 135. The geofence monitor 135 may be implemented as dedicated integrated circuit hardware or may be a software module executable by a computing system (e.g., an implementation of computing system 1000). The geofence monitor 135 is responsible for determining media content the on-board media system 137 may provide to passenger/client devices 120. The geofence monitor 135 may control the media content to be provided based on data representing the location of the transport craft 110 (hereinafter, interchangeably referred to as positional data).

A geofence is a data representation of a geographic area (i.e., a geofenced area). The geofence may virtually encompass a geofenced area for which the geofence represents a geographic boundary. The geofence may be represented in data in any number of ways including by geographical points, known geographical regions, or other predefined geographical areas. In implementations where geofences are represented by points, the points may be sets of geographic coordinates. For example, in an implementation, the geofence data may comprise sets or tuples of longitude and latitude values. In an implementation, each tuple includes one longitude value and one latitude value. The sets of tuples may define nodes or points the connections or edges of which represent one or more boundaries of the geofenced area. Portions of the geofence may alternatively or additionally be defined by one or more of piecewise and continuous functions based on one or more of geographic locations, anticipated trajectories, departure times, arrival times, transit times, and positional data as inputs. In implementations, the geofence can conform to any number of shapes. For example, the geofence may have boundaries with properties of one or more of a polygon, a curvilinear shape, a circle (e.g., defined by a radius or diameter and a center), a triangle, and the like. The geofence may also be defined by or based on existing geographic borders such as those of one or more of countries, cities, counties, states, territories, local regions, regions defined by media content licensing agreements, or regions defined by other jurisdictional legal restrictions (e.g., regions where certain types of media content are forbidden). The geofences may further have temporal elements. For example, certain media offerings may be available at different times even within a particular geofence, and the geofences themselves may shift geographically depending on time (e.g., if permissions in contiguous areas shift, such that the areas are merged or separated).

The positional data may be generated and provided by the craft status monitor 190. In an implementation, the craft status monitor 190 is a component of or in communication with navigation systems of a transport craft (e.g., a tail system of an aircraft). Other implementations of the craft status monitor may 190 include other geolocation devices, such as global positioning service (GPS) devices. The positional data may include one or more of a current location of the transport craft 110, a vector or trajectory on which the transport craft 110 is traveling, data representing a path the transport craft 110 has already taken, a deviation from a predefined route, a velocity of the transport craft 110, an altitude of the transport craft 110, a temporal delay, a traffic update, a longitude of the transport craft 110, a latitude of the transport craft 110, and the like. The positional data may be used in conjunction with geofence data to determine whether a geofence condition is satisfied. A geofence condition may include one or more of that a transport craft 110 is located within a geographic location represented by geofence data, that a transport craft 110 is located outside of a geographic location represented by geofence data, that the transport craft 110 is located within a predefined distance of a boundary of a geofenced area, that the transport craft 110 is located within a reduced geofenced area, that the transport craft 110 is approaching a boundary of a reduced geofenced area, and the like. In different implementations, the reception of, transmission of, and determinations associated with the positional data and geofence data may be distributed and/or allocated between the on-board CMS 130 and the off-board CMS 140. In implementations, the positional data may be received by a location data module of the on-board CMS 130 that is executable by a computer system (e.g., an implementation of computer system 1000).

In an implementation in which the geofence monitor 135 is operable to determine whether a geofence condition is satisfied, the geofence monitor 135 may use the positional data in the determination. For example, the geofence monitor 135 may receive geofence data from the off-board CMS 140 (e.g., via the off-board communication network 105) and receive the positional data from the craft status monitor 190. The geofence monitor 135 may determine based on the received geofence data and the received positional data whether a geofence condition is satisfied. In this implementation, the positional data may be transmitted from the craft status monitor 190 to the on-board CMS 130 (e.g., via the network access unit 176).

In an implementation in which the geofence monitor 135 is operable to determine whether a geofence condition is satisfied, the on-board CMS 130 and/or the geofence monitor 135 may receive the geofence data at different frequencies. In an implementation, geofence data may be loaded once before the transport craft 110 departs. In another implementation, the geofence data may be periodically updated or may be updated dynamically responsive to conditions. For example, one or more of the geofence data and the positional data may be received and/or updated at a predefined frequency (e.g., frequency of times updates are provided, not a frequency of the signal). In another implementation, the predefined frequency may be dynamic based on the positional data and one or more of geofence data and reduced geofence data. For example, the frequency of updating may be lower when it is less likely that the transport craft 110 is close to crossing one or more of a geofence boundary and a reduced geofence boundary. In an implementation, the predefined frequency increases as a geographical distance between a position of the transport craft 110 (e.g., provided with the positional data) and a geofence boundary represented in the data representing the geofenced area decreases. The frequency of determinations made or received may similarly vary or may vary differently.

Alternatively or additionally, the positional data may be transmitted from the craft status monitor 190 to the off-board CMS 140 (e.g., via one or more of the on-board CMS 130, the network access unit 176, and the off-board network interface subsystem 170). For example, in an alternative implementation, the off-board CMS 140 determines whether a geofence condition is satisfied. In this implementation, the positional data is transmitted from the on-board system 150 to the off-board CMS 140. The off-board CMS 140 uses locally available geofence data and the transmitted positional data to determine whether a geofence condition is satisfied. In this implementation, the determination of whether the geofence condition is satisfied is transmitted to the on-board CMS 130 via the off-board communication network 105. In this implementation, the geofence monitor 135 may receive the determination and determine the media content the on-board media system 137 may provide to the passenger/client devices 120 based on the received determination. The frequency of determinations made or received may be consistent, periodic, responsive to predefined events, responsive to locations within a geofenced area, and the like.

One or more of the on-board CMS 130 and the off-board CMS 140 may determine which media content the on-board media system 137 may provide to passenger/client devices 120 based on the determination of whether the geofence condition is satisfied. In an implementation, a media control module, executable by a computing system (e.g., an implementation of computing system 1000), may determine which media content the on-board media system 137 may provide to passenger/client devices 120 based on whether the geofence condition is satisfied.

In an implementation, there may be a plurality of media contents each with different associated geofence conditions. In this implementation, for example, live content provided by different providers and under different legal or licensing conditions may have different requirements relative to the geographical location of the transport craft 110. As such, geofence data specific to media content may be associated with, stored with, or otherwise linked to data representing the media content. The association may be with the media content itself or may be with metadata that represents the media content separately of the media content data itself.

The geofence system 100 may also determine when and/or under what circumstances to activate a geofence monitor 135. One or more of the determination and activation may be distributed between or facilitated by the on-board CMS 130 and the off-board CMS 140. One or more of the geofence monitor 135 of the on-board CMS 130 and the off-board CMS 140 (e.g., the determining entity) may determine whether a geofence activation condition is satisfied. In implementations, the determination of whether the geofence activation condition is satisfied is based on data representing the route or trajectory of the transport craft 110 and/or other positional data. Predefined geographic data regarding the route or path of the transport craft can be transmitted to the determining entity. For example, the predefined geographic data may include a departure location and a destination location. In this implementation, a geofence activation condition may include that a departure location and a destination location be in differing geofenced areas. In trips where the licensing rights and other legal limitations do not change, there may be no need for a geofence monitor. The same content may be transmitted throughout the trip. In this instance, the determining entity may determine that the geofence activation condition is not satisfied. As such, the geofence monitor 135 may be deactivated (or, at least its geofence monitoring activity) for the duration of the particular trip. Conversely, if the departure location and the destination location are in different geofenced areas, the determining entity may determine that the geofence activation condition is satisfied and may activate or cause activation of the geofence monitor.

Alternative implementations are contemplated in which, even in situations where the trip is one in which legal and licensing rights do not change, the geofence monitor 135 is still activated and/or remains active at all times in which the transport craft 110 is in transit. Further, the geofence activation condition may have a temporal element. For example, the transport craft 110 may travel during more relaxed times for licensing. As such, the activation of the geofence monitor 135 may be dependent upon the time of day the trip occurs. In an implementation, the trip may occur over a duration over which temporal dimensions of the licensing scheme associated with media content changes. The geofence activation condition may be satisfied in such circumstances. Also, in another implementation, a detour may cause a redetermination (e.g., by a determining entity) of whether to activate the geofence monitor 135 because the transport craft will unexpectedly cross a geofence boundary based on the detour.

The geofence system 100 may further be operable to estimate a temporal metric associated with when a transport craft will cross a boundary of a geofenced area represented in the geofence data. This may be determined by one or more of the on-board CMS 130 and the off-board CMS 140 (i.e., the determining entity specific for determining the time). The temporal metric may include one or more of a time of crossing, a time to crossing, or a deviation from an expected time of crossing or time to crossing. In an implementation, the determining entity may have data stored representing a reduced geofence associated with a geofence. The reduced geofence may be smaller than the geofence and contained within the geofence. The reduced geofence may serve as a set of sub-boundaries that indicate when a transport craft 110 crosses one of the sub-boundaries that there is a certain time or distance the transport craft 110 will take to cross the corresponding geofence. In an implementation, the reduced geofence may be defined by a predefined distance from the geofence at all relevant points and/or sides. In an implementation, the reduced geofence is substantially geometrically similar to the geofence. Implementations are contemplated in which the reduced geofence accounts for likely conditions at different parts of the geofence, such that some points of the reduced geofence are further from the closest point on a geofence than other points on the geofence. For example, some areas may have greater winds or stormier weather. Also, the reduced area may, based on the trajectory of travel, for example, be smaller on a side where the transit craft is traveling against prevailing wind patterns. The determining entity may estimate based on the positional data and the reduced geofence, a likely time that the transport craft will cross a geofence boundary.

In implementations with or without reduced geofences, the determining entity may additionally or alternatively determine an estimated time the transport craft 110 will cross a boundary of a geofence based on one or more of positional data, geofence data, predefined data representing the route taken, known deviations from expected trajectories, weather conditions near the transport craft 110, traffic metrics, other delays, detours, deviations, and the like. For example, in an implementation, the determining entity may be operable to estimate, based on a transit vector of the transport craft included in the received data representing a location of the craft, when the transport craft will cross a boundary of the geofenced area.

In an implementation, the on-board CMS 130 (e.g., via one or more of the geofence monitor 135 and a media control module) may transmit a modification to the media content to be provided by the on-board media system 137 to a passenger/client device 120. This may be based on satisfaction of the geofence condition or an anticipated satisfaction of the geofence condition (because a geofence boundary is being approached). The on-board CMS 130 may further transmit instructions to the on-board media system 137 to notify a passenger/client device 120 of the modification to the media content to be provided. For example, the notification may include an anticipated termination of media content being provided to the passenger/client device 120. In implementations in which the determining entity estimates a time in which the transport craft 110 will cross a boundary of a geofence, the notification may include an estimated time until termination of the programming based on the estimated time of crossing.

In an implementation, geofence monitor 135 may modify media content to be provided by the on-board media system 137 to the passenger/client devices 120 in advance or in anticipation of crossing a geofence boundary. For example, the geofence condition may include the positional data representing a location of a transport craft 110 satisfying a distance or timing condition relative to a geofence boundary. The distance condition may include that the positional data represents that the transport craft 110 is within a predefined distance of a geofence boundary and/or that the vector on which the transport craft 110 is traveling (or on an otherwise projected trajectory based on a route that may be other than linear) shows that the distance along the vector (or trajectory) from the transport craft 110 to a geofence boundary is within a predefined distance. A timing condition can include that an estimated time of crossing one or more of a geofence or reduced geofence boundary is within a predefined time. Determining distances and times that satisfy these conditions can be different for aircraft than for land craft because altitude and curvature of the earth may be more significant factors. For aircraft, curvilinear trajectories may be more appropriate than linear ones. For land craft, trajectories may be based on the available roads and the artificial bends and turns of a road. Distance and timing conditions may account for these factors when assessing vectors and/or trajectories.

The geofence data may represent boundaries for specific licensing conditions. For example, even if media content may still be provided in two geofenced areas, the conditions under which the media content may be provided may differ between the geofenced areas. For example, the media content may be viewed free of charge in a first geofenced area, but licensing may require that a fee be paid for the same content in the second geofenced area. In an implementation, the on-board CMS 130 may determine that access to a specific media content requires acceptance of a modified condition (e.g., a passenger must pay a fee). The on-board CMS 130 (e.g., via one or more of the geofence monitor 135 and a media control module) may transmit a modified condition for providing media content to the on-board media system 137. The on-board CMS may further transmit instructions to the on-board system to request that a user device provide data representing acceptance of the modified condition for providing the media content.

Broadcast channels 146 can be obtained from the off-board CMS 140 over the off-board communications network 105. In some implementations, the off-board CMS 140 includes one or more sources of broadcast channel content. For example, the off-board CMS 140 is directly affiliated with one or more content broadcasters, content aggregators, etc. (e.g., the off-board CMS 140 is implemented as part of a cable provider headend, or the like). In other implementations, the off-board CMS 140 is coupled with one or more content sources 180 (e.g., content servers) via one or more content networks 160. The content source(s) 180 can include content broadcasters, content aggregators, and/or any other suitable source of broadcast channel content. In some such implementations, the content source(s) 180 and content network(s) 160 include one or more commercial terrestrial television networks, satellite television providers, over-the-air television broadcasters, over-the-top Internet television providers, etc. The off-board CMS 140 can communicate the broadcast channels 146 in any suitable manner. In some implementations, each broadcast channel 146 is communicated over the off-board communications network 105 as a corresponding Internet protocol television (IPTV) stream. In other implementations, each broadcast channel 146 is communicated over the off-board communications network 105 as a unicast communication, as a multicast communication, over an established logical communication link (e.g., a tunnel), or in any other suitable manner.

As used herein, a "broadcast channel 146" is a channel communicated by the off-board CMS 140 to the on-board CMS 130 via the off-board communications network 105 (and the off-board network interface subsystem 170). In some implementations, when a particular broadcast channel 146 is being communicated from the off-board CMS 140 to one or more transport craft 110, the broadcast channel 146 directly corresponds to a television channel that is contemporaneously being broadcast over conventional broadcast television networks (e.g., a cable network, satellite television network, etc.). In other implementations, one or more of the broadcast channels 146 is generated by aggregating broadcast channel content, such that the availability, order, and/or other features of some or all broadcast channels 146 differ from television channels that are broadcast over conventional broadcast television networks. In one such implementation, broadcast channel content is selected by a commercial television network to be delivered (e.g., at certain times, in certain orders, with certain restrictions, etc.) to the off-board CMS 140 for use in broadcast channels 146. In another such implementation, broadcast channel content is aggregated from one or more affiliates of a commercial television network. For example, a commercial television sports network may aggregate licensed content relating to sports teams associated with a departure and/or destination region for a transport craft 110; a commercial television network may aggregate licensed television programs and/or movies likely to be of interest to certain passenger audiences of transport craft 110. In some implementations, the off-board CMS 140 receives the broadcast channel content already in a proper format for communication to the transport craft 110, and the off-board CMS 140 may communicate the received broadcast channel content as the broadcast channel 146. In other such implementations, the off-board CMS 140 receives broadcast channel content in a first format, converts the broadcast channel content to a second format that is compatible for provision by the on-board CMS 130, and communicates the converted content as the broadcast channel 146.

Implementations of the off-board CMS 140 can operate to communicate broadcast channels 146 over the off-board communications network 105 only when those broadcast channels 146 are being used by one or more on-board CMSs 130. Halting communication of a broadcast channel 146 when the broadcast channel 146 is not being used by any on-board CMSs 130 can free up the resources e.g., bandwidth) of the off-board communications network 105 that would otherwise be used to continue communicating (e.g., streaming) the broadcast channel 146. In some implementations, the off-board CMS 140 directs communication of the broadcast channels 146 over the off-board communications network 105 and halting of those communications at appropriate times. For example, in implementations, the off-board CMS 140 can make its own determination as to when and whether to communicate (e.g. and generate) one or more broadcast channels 146 over the off-board communications network 105. In other implementations, the on-board CMSs 130 direct communication of the broadcast channels 146 over the off-board communications network 105 by instructing the off-board CMS 140 to commence and halt those communications at appropriate times. For example, in implementations, the on-board CMS 130 can generate instructions (e.g., requests to commence transmission of broadcast channels 146, requests to halt transmission of broadcast channels 146, etc.), and can communicate those instructions to the off-board CMS 140 over the off-board communications network 105.

In one implementation, no instructing or other action is taken with respect to the upcoming end of the present programming time slot, and the particular broadcast channel 146 is allowed to continue being communicated by the off-board CMS 140 and received by the on-board CMS 130 over the off-board communications network 105. In another implementation, the on-board CMS 130 and/or the off-board CMS 140 communicates instructions directing continued communication of the particular broadcast channel Implementations of the on-board media system 137 are disposed on the transport craft and can have, stored thereon, a number (e.g., hundreds, thousands, etc.) of pre-positioned content segments. The on-board media system 137 can include any suitable type or types of data storage, such as one or more hard disk drives, solid-state drives, removable storage media, etc. The pre-positioned content segments are stored on the on-board media system 137. In some implementations, some or all of the pre-positioned content segments are stored to the on-board media system 137 when the transport craft 110 is not in transit, for example, while the transport craft 110 is parked, docked, etc. In other implementations, some or all of the pre-positioned content segments are pushed to the on-board media system 137 opportunistically. For example, opportunistic multicasting, trickle-casting, or other techniques can be used to exploit detected availability of excess capacity on the off-board communications network 105 while the transport craft 110 is in transit. The pre-positioned content segments can include any suitable content segments, such as television program episodes, movies, movie previews, transit information, advertisements, etc. In some implementations, some or all of the pre-positioned content segments can be accessed on-demand by some or all passengers of the transport craft 110 using their passenger/client devices 120. In some implementations, some or all of the pre-positioned content segments are stored in association with a corresponding set of (one or more) content parameters. The content parameters can be stored as metadata, or otherwise stored in association with the pre-positioned content segments (e.g., using a relational database structure). Each corresponding set of content parameters can include any suitable information describing its associated pre-positioned content segment(s), such as content types (e.g., television program episode, movie, advertisement, etc.), genres (e.g., comedy, drama, documentary, reality, family, etc.), content descriptors (e.g., title, keywords, run length, director, rating, etc.), content format (e.g., resolution, file type, device compatibility, etc.), content associations (e.g., distributor, network or other affiliation, related pre-positioned content segments, etc.), rights information (e.g., rights holder, distribution requirements or limitations, encryption information, etc.), etc.

The on-board CMS 130 can automatically produce one or more customized channels for streaming to the passenger/client devices 120 via the on-board network interface subsystem 177 in accordance with one or more linear channel schedules. Each linear channel schedule can define a sequence of programming time slots, including multiple broadcast programming time slots, and multiple pre-positioned programming time slots. The linear channel schedule can be formatted and stored in any suitable manner. In some implementations, the linear channel schedule is stored by the on-board media system 137. In other implementations, the linear channel schedule is stored by (e.g., and/or generated by, maintained by, etc.) the off-board CMS 140.

Figure 2:
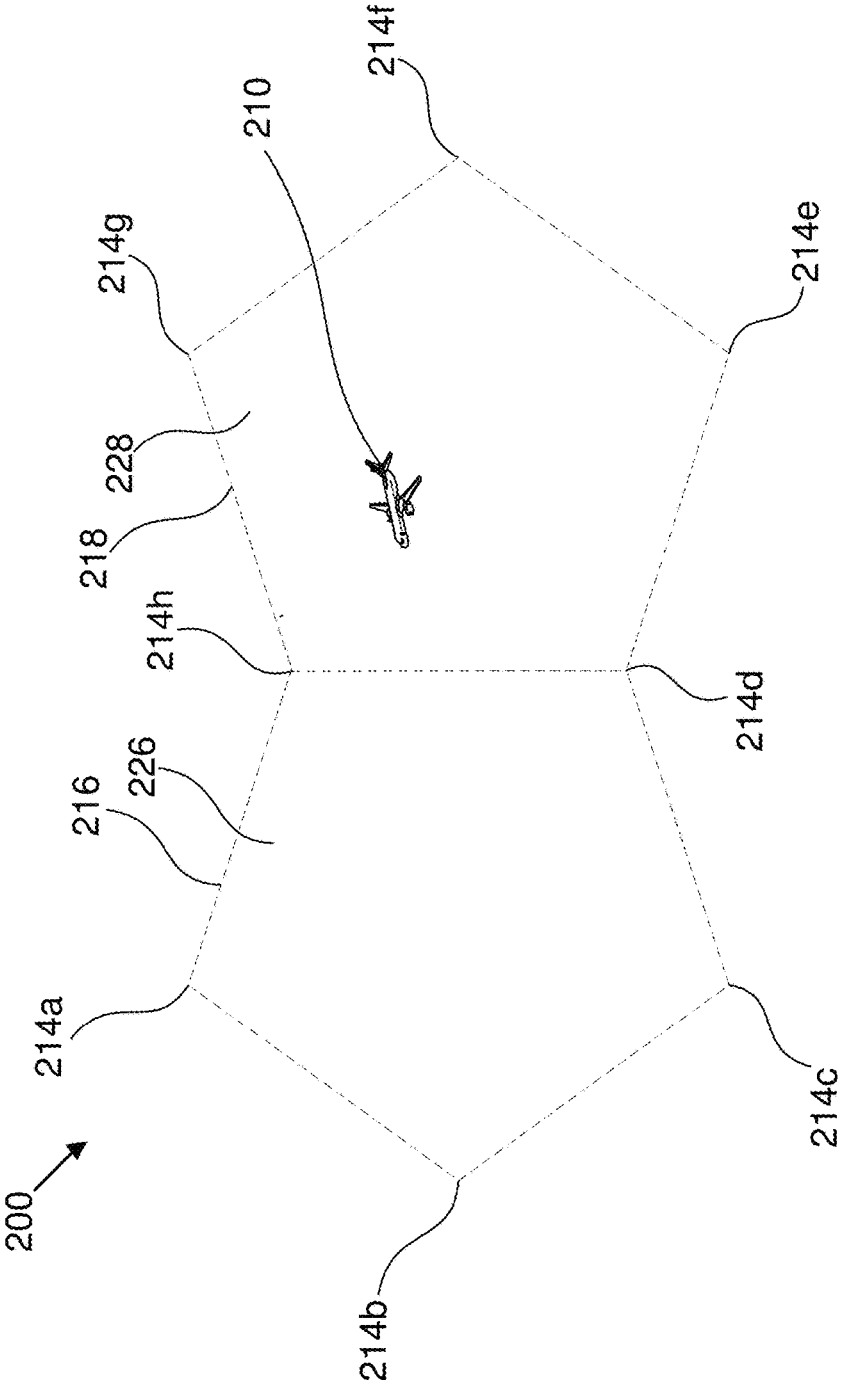
FIG. 2 illustrates an exemplary implementation of a geofence system with contiguous geofenced areas.

FIG. 2 illustrates an exemplary implementation of a geofence system 200 with contiguous geofenced areas. The geofence system 200 may be an implementation of geofence system 100, and transport craft 210 may be an implementation of transport craft 110 (e.g., an implementation of one of 110a-n). The illustrated geofence system 200 includes two pentagonal geofences 216, 218. The geofences 216, 218 may each virtually encompass a geofenced area 226, 228 for which the geofence represents a geographic boundary. While illustrated as contiguous and sharing a boundary, geofences 216, 218 need not be contiguous. For example, in implementations, there may be areas with no limitation on the content presented, such that the geofences 216, 218 are separated by areas in which there are different licensing or legal restrictions on provided media content. In some implementations, the geofences may be conservatively drawn to assure that no media content restrictions are violated (e.g., there are spaces between geofences that basically represent media content no man's land). Also, in implementations, the geofences may be specific to and/or associated in data with certain media content such that geofences 216, 218 for a particular media content may partially overlap geofences 216, 218 for other media content.

While illustrated as pentagonal, any shapes of geofences 216, 218 are contemplated. For example, the geofence may have boundaries with properties of one or more of a polygon, a curvilinear shape, a circle (e.g., defined by a radius or diameter and a center), a triangle, and the like. The geofences 216, 218 may be of a same (e.g., if the geofences 216, 218 are divided into a uniform grid) or different shape. The geofence may also be defined by or based on existing geographic borders such as those of one or more of countries, cities, counties, states, territories, local regions, regions defined by media content licensing agreements, regions defined by other jurisdictional legal restrictions (e.g., regions where certain types of media content are forbidden). The geofences 216, 218 may further have temporal elements. For example, certain media offerings may be available at different times even within a particular geofence, and the geofences themselves may shift geographically depending on time (e.g., if permissions in contiguous areas shift, such that the areas are merged or separated). Further, the geofences 216, 218 may be non-contiguous because the geofences 216, 218 are conservatively formed to be smaller than the areas where media content may be provided by license or law to add extra assurance that no media content restrictions are violated. Though not illustrated in FIG. 2, the geofences 216, 218 may additionally or alternatively include reduced geofences that virtually encompass reduced geofenced areas (see e.g., system 300).

The geofences 216, 218 may be represented in data in any number of ways including by geographical points, known geographical regions, or other predefined geographical areas. In an implementation, the geofence system 200 includes points 214a-h (or nodes). The points 110a-n may be connected to define boundaries (or edges) of the geofences 216, 218. In implementations where geofences are represented by points 110a-n, the points 110a-n may be sets of geographic coordinates. For example, in an implementation, the geofence data may include points 110a-n each of which includes a set or tuple including longitude and latitude values. In an implementation, each tuple includes one longitude value and one latitude value. The sets of tuples may define points 110a-n and/or the connections (or edges) of which represent one or more boundaries of a geofenced area. Portions of the geofences 216, 218 may alternatively or additionally be defined by one or more of piecewise and continuous functions (e.g., between predefined points) based on one or more of geographic locations, anticipated trajectories, departure times, arrival times, transit times, and positional data as inputs. Further, the piecewise and/or continuous functions may be defined relative to one or more of points 110a-n.

As illustrated, points 214a-214d and 214h and edges between them define a first geofence 216 that encompasses the first geofenced area 226. As illustrated, points 214d-h and edges between them define a second geofence 218 that encompasses second geofenced area 228. Because the geofences 216, 218 are contiguous, the geofences 216, 218 may share points 214d, 214h along a shared boundary. The transport craft 210 is illustrated as traveling in the second geofenced area 228 within the second geofence 218. The second geofenced area 228 may be one in which licensing or other legal restrictions allow the presentation of media content associated with the second geofenced area 228 (e.g., by data association based on licensing or legal restrictions). Restrictions that apply to the transport craft 210 while in the second geofenced area 228 encompassed by the second geofence 218 may not apply when the transport craft 210 passes into the first geofenced area 226. If the transport craft leaves the second geofenced area 228 and enters the first geofenced area 226, rules for providing media content associated with the second geofence 218 may be replaced with (or otherwise prioritized over) rules for providing media content associated with the first geofence 216. It should be appreciated that the geofences 216, 218 may apply to some of the media content available for provision to passenger/client devices, but other geofences may apply to different media content.

Figure 3:
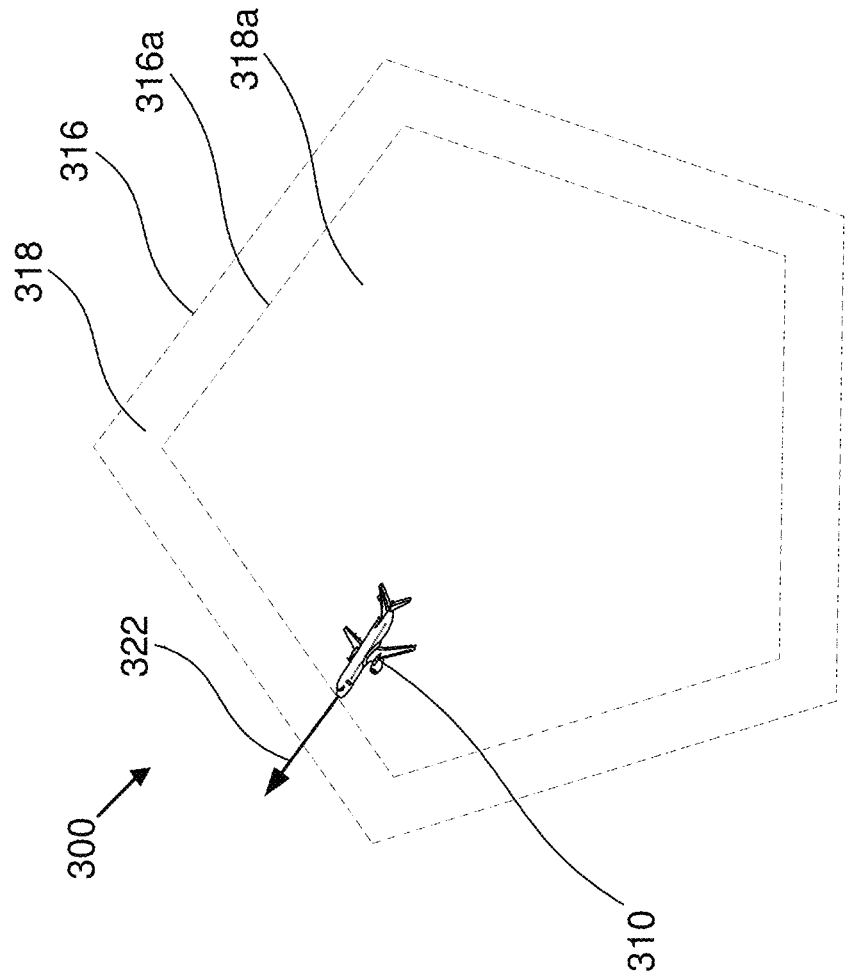
FIG. 3 illustrates an exemplary implementation of a geofence system 300 that estimates the timing of a geofence boundary crossing.

FIG. 3 illustrates an exemplary implementation of a geofence system 300 that estimates timing of a geofence boundary crossing. The system 300 may be an implementation of one or more of systems 100 and 200. The transport craft may be an implementation of one or more of transport crafts 110 and 210. The system 300 includes a geofence 316 having a reduced geofence 316a. The geofence 316 virtually encompasses a geofenced area 318, and the reduced geofence 316a virtually encompasses a reduced geofenced area 318a.

The reduced geofence 316a may be defined relative to the geofence 316. For example, the reduced geofence 316a may be one or more of geometrically similar to and a predefined distance from (e.g., a virtual representation of a uniform or differing predefined distance) the geofence 316. For instance, the reduced geofence 316a may be concentric relative to the geofence 316 (e.g., even in relation to an irregular shape such as a geographic border or the like). Alternatively or additionally, the reduced geofence 318 may be defined relative to the geofence 316 based on a predefined determination of likely times to crossing over various historically used paths or routes, potentially accounting for the likely trajectories, speeds, and/or route conditions (e.g., weather and/or traffic). The reduced geofence 316a can be used to estimate the time the transport craft 310 will cross a geofence 316. For example, when the transport craft approaches a boundary of the reduced geofenced area 318a, a geofence monitor of an on-board CMS may trigger a determination of an estimated crossing time and/or estimated time to crossing. The reduced geofence 316a may thusly operate as a safeguard to assure that media content provided when crossing the boundary of the geofenced area 318 is authorized in a next geofenced area represented by a next geofence (not illustrated in FIG. 3).

The crossing timing may be estimated based on one or more of geofence data that represents geofence 316, geofence data representing the next geofence, positional data, externally provided navigation data (e.g., GPS data), and the like. In an implementation, the positional data includes a trajectory 322 (e.g., a transit vector) of the transport craft 310. Based on the speed and direction of the transport craft 310 and a predefined distance between a boundary of the reduced geofenced area 318a and a boundary of the geofenced area 318. Implementations are also contemplated in which the crossing timing is estimated based on the positional data and the geofence 316 data without reference to a reduced geofence 318 or its reduced geofenced area 318a. While the positional data used is illustrated as a trajectory 322, other positional data may be used. For example, in the context of an aircraft, the timing of crossing may be predefined based on the location of the craft and historical flight data for flights using a same or similar flight path. In the context of a road vehicle, the estimated timing may be based on historical route timing, perhaps accounting for the nature of roads and traffic.

The crossing timing may be used to trigger an action associated with a crossing or anticipated crossing of a geofence 316. In implementations, if a certain predefined crossing timing condition is satisfied, a crossing preparation action may be taken. For example, the predefined crossing timing condition may include a time threshold representing a threshold estimated time until crossing a boundary of a geofenced area 318. This determination may be triggered by a crossing of a boundary of a reduced geofenced area 318a or may be triggered by a determination of crossing time unrelated to a reduced geofence 316a. The crossing preparation actions potentially triggered by satisfaction of the crossing timing condition may be taken by a geofence monitor and may include one or more of preemptively modifying the content provided (e.g., to be consistent with limitations of a next geofence the next geofenced area of which the transport craft 310 is about to enter), providing instructions to an on-board media system to modify the content provided (e.g., immediately or in a conservative estimated time that assures licenses or other legal restrictions are not violated), providing instructions to an on-board media system to notify a passenger/client device that media content may no longer be available, providing instructions to an on-board media system to notify a passenger/client device that media content may be available under different conditions, providing instructions to an on-board media system to notify a passenger/client device that media content may be available upon the on-board media system receiving approval of a condition from a passenger/client device (e.g., agreeing to provide payment for a media content offering the license of which requires different payment terms in a next geofenced area), providing instructions to prefetch new geofence data for a next geofence on a trajectory 322, and the like.

Figure 4:
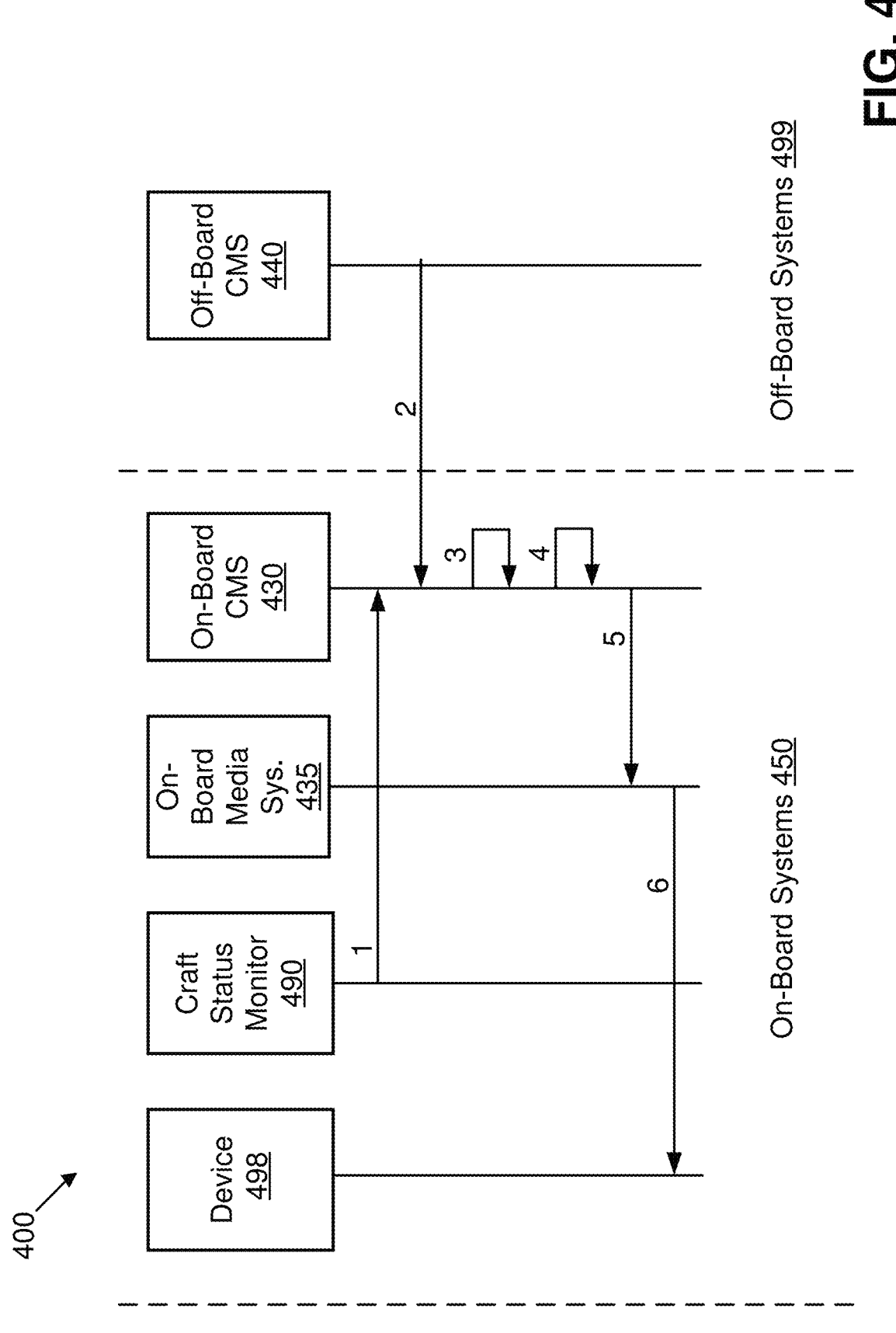
FIG. 4 illustrates an exemplary implementation of a system for coordinating operations of a geofence system.
Figure 5:
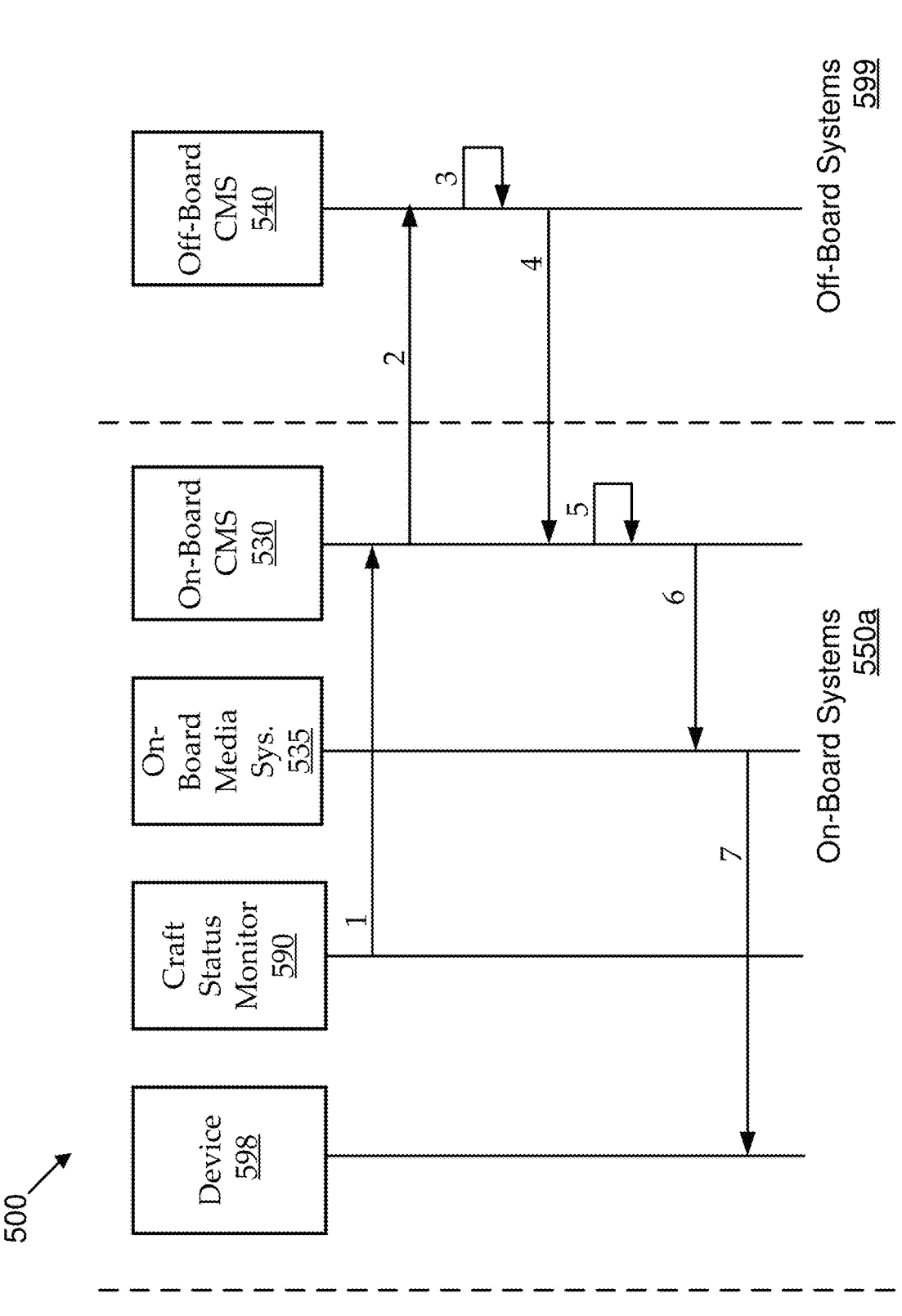
FIG. 5 illustrates another exemplary implementation of a system for coordinating operations of a geofence system.

FIGS. 4 and 5 illustrate two scenarios representing the manner in which determinations regarding one or more of geofences, geofence conditions, media content to be provided, and geofence activation conditions can be distributed in any manner between an on-board CMS 430, 530 and an off-board CMS 440, 540. Specifically, FIG. 4 illustrates an exemplary implementation of a system 400 for coordinating operations of a geofence system. In the illustrated implementation, a geofence monitor of an on-board CMS 430 is responsible for determining satisfaction of certain conditions associated with a geofence (e.g., based on geofence data). The system 400 includes on-board systems 450 located on the transport craft and off-board systems 499 located remotely from the transport craft. A craft status monitor 490 transmits in communication 1 locational data to an on-board CMS 430. The positional data may include one or more of a current location of the transport craft, a vector or trajectory on which the transport craft is traveling, data representing a path the transport craft has already taken, a deviation from a predefined route, a velocity of the transport craft, an altitude of the transport craft, a temporal delay, a traffic update, a longitude of the transport craft, a latitude of the transport craft, and the like. The positional data may be used in conjunction with geofence data to determine whether a geofence condition is satisfied.

In communication 2, an off-board CMS 440 transmits geofence data representing a geofence that virtually encompasses a geofenced area to the on-board CMS 430. While illustrated as conducted in a particular order, the order of operations of communications 1 and 2 may be reversed and may be conducted at differing frequencies.

In determination 3, the geofence monitor of the on-board CMS 430 determines whether a transport craft (e.g., its location) satisfies a geofence condition based on the received positional data and the received geofence data. For example, the geofence monitor may determine that the transport craft's locational data represents that the transport craft is within a boundary of a geofenced area represented by a geofence.

In determination 4, the on-board CMS 430 and/or its geofence monitor determines media content to be provided to or by an on-board media system 435 for consumption by passenger/client devices 498 on the transport craft. The media content to be provided may be based on the determination of whether the geofence condition is satisfied. For example, if a geofence condition is satisfied, media content associated with the geofence for which the geofence condition applies may be restricted, provided, or may be provided under circumstances that differ in the geofence from an adjacent or other geofence.

In communication 5, media content that is allowed is provided by the on-board CMS 430 to the on-board media system 435. Alternative implementations are contemplated in which communication 6 represents an instruction that dictates which media content of the media content that is available to the on-board media system 435 to provide for passenger/client consumption.

In communication 6, the on-board media system 435 provides the media content provided and/or permitted by the on-board CMS 430 to at least one passenger/client device 498.

FIG. 5 illustrates another exemplary implementation of a system 500 for coordinating operations of a geofence system. In the illustrated implementation, an off-board CMS 530 is responsible for determining satisfaction of certain conditions, and the determination is transmitted to a geofence monitor of an on-board CMS. The system 500 includes on-board systems 550 located on the transport craft and off-board systems 599 located remotely from the transport craft. A craft status monitor 590 transmits in communication 1 locational data to an on-board CMS 530.

In communication 2, the on-board CMS 530 transmits the positional data to the off-board CMS 540. In an alternative implementation, the craft status monitor may transmit the location data in communication 1 to the off-board CMS 540 without using the on-board CMS 530 as an intermediary (e.g., negating communication 2).

In determination 3, the off-board CMS 540 determines whether a transport craft (e.g., its location) satisfies a geofence condition based on the received positional data. The off-board CMS 540 may have geofence data representing a geofence that virtually encompasses a geofenced area and may use the received positional data to determine whether the geofence condition is satisfied. For example, the geofence monitor may determine that the transport craft's locational data represents that the transport craft is within a boundary of a geofenced area represented by a geofence.

In communication 4, the off-board CMS 540 transmits the determination of whether the geofence condition is satisfied to the on-board CMS 530. In implementations, the determination may be received by a geofence monitor of the on-board CMS 530.

In determination 5, the on-board CMS 530 and/or its geofence monitor determines media content to be provided to or by an on-board media system 535 for consumption by passenger/client devices 598 on the transport craft. The media content to be provided may be based on the determination of whether the geofence condition is satisfied. For example, if a geofence condition is satisfied, media content associated with the geofence for which the geofence condition applies may be restricted, provided, or may be provided under circumstances that differ in one geofenced area from an adjacent or other geofenced area.

In communication 6, media content that is allowed is provided by the on-board CMS 530 to the on-board media system 435. Alternative implementations are contemplated in which communication 6 represents an instruction that dictates which media content of the media content that is available to the on-board media system 435 the on-board media system 435 may provide for passenger/client consumption.

In communication 7, the on-board media system 435 provides the media content provided and/or permitted by the on-board CMS 530 to at least one passenger/client device 598.

While not illustrated in FIGS. 4 and 5, in implementations, one or more of the on-board CMS 430, 530 and off-board CMS 440, 540 may make an initial determination of whether to activate the geofence monitor and/or the geofence system to activate monitoring and/or managing media content provided based on satisfaction of conditions related to geofences. The initial determination may involve determining whether a geofence activation condition is satisfied, as described in this specification. Determining of other conditions associated with the geofence are also contemplated, and the responsibility for determining whether the conditions are satisfied may be distributed between the on-board CMS 430, 530 and off-board CMS 440, 540 in any manner.

FIG. 6 illustrates an exemplary implementation of on-board content management system processor-readable storage media 600. The media 600 exclude signals per se. In an implementation, the media are one or more of non-transitory and tangible. The media 600 may be an implementation of storage 1020 or a portion thereof. The media 600 may include one or more of a location data module 695, a geofence monitor 696, and a media control module 697, each of which may be stored in memory (e.g., the media 600 and/or storage 1020) and may be executable by a processor of a computing system (e.g., processor(s) 1002 of computing system 1000).

The location data module 695 is a hardware and/or software implemented logic element that manages positional data for the on-board CMS. The location data module 695 may one or more of receive, store, and determine positional data of the transport craft. A craft status monitor of a transport craft may transmit positional data to an on-board CMS. The location data module 695 of the on-board CMS receives this data and performs operations on the data. In various implementations, the location data module 695 may forward some or all of the positional data to one or more of the geofence monitor 696 and an off-board CMS. The location data module 695 may also reformat, remove, or otherwise filter some of the positional data before transmission for consumption by the recipient entity. For example, the transport craft systems may provide positional data in a first format that differs from the format used by the geofence monitor 696 and/or off-board CMS, and the location data module 695 may translate it. Also, the craft status monitor may provide more data than the geofence monitor 696 or off-board CMS is configured to use, so the location data module 695 may remove superfluous data. Implementations are contemplated in which the location data module 695 is an element of the geofence monitor 696.

The geofence monitor 696 is a hardware and/or software implemented logic element that manages geofence system operations of the on-board CMS. The geofence monitor 696 may be an implementation of geofence monitor 135. The geofence monitor 696 is responsible for determining media content an on-board media system may provide to passenger/client devices. The geofence monitor 696 may control the media content to be provided based on positional data representing the location of a transport craft. The geofence monitor 696 may determine changes to media content available and/or may modify the conditions under which the media content is available. For example, the geofence monitor 696, based on whether a geofence condition is satisfied, may determine one or more of which media content should be provided, modifications to media content already provided, conditions under which media content should be provided, instructions to transmit to an on-board media system regarding messages to provide to a passenger/client device regarding modifications to provided media content, instructions to an on-board media system regarding approvals for modified conditions the on-board media system must obtain from a passenger/client device to continue providing media content, and the like.

The geofence monitor 696 may store and/or receive data associated with a geofence (e.g., data representing one or more of geofences, geofence conditions, media content to be provided, geofence activation conditions, distance or timing conditions, licensing conditions, conditions under which media content is to be provided, modified conditions, crossing timing conditions, and passenger/client device conditions provided by an off-board CMS) and positional data (e.g., positional data processed by the location data module).

In an implementation in which the geofence monitor 696 is operable to determine whether a geofence condition is satisfied, the geofence monitor 696 may use positional data in the determination. For example, the geofence monitor 696 may receive geofence data from an off-board CMS (e.g., via an off-board communication network) and receive the positional data from a craft status monitor. The geofence monitor 696 may determine based on the received geofence data and the received positional data whether a geofence condition is satisfied. In this implementation, the positional data may be transmitted from the craft status monitor to the on-board CMS (e.g., via a network access unit). In an implementation in which the geofence monitor 696 is operable to determine whether a geofence condition is satisfied, the on-board CMS and/or the geofence monitor 696 may receive the geofence data at different frequencies. In an alternative implementation, the geofence monitor 696 may receive the determination of whether the geofence is condition is satisfied from an off-board CMS and determine the media content the on-board media system may provide to passenger/client devices based on the received determination.

The geofence system and/or the geofence monitor 696 itself may also determine when and/or under what circumstances to activate the geofence monitor 696 to control media content provided for consumption by passenger/client devices. One or more of the determination and activation may be distributed between or facilitated by the on-board CMS and the off-board CMS. One or more of the geofence monitor 696 of the on-board CMS and the off-board CMS (e.g., the determining entity) may determine whether a geofence activation condition is satisfied. In implementations, the determination of whether the geofence activation condition is satisfied is based on data representing the route or trajectory of the transport craft. For example, predefined geographic data regarding the route or path of the transport craft can be transmitted to the determining entity. The predefined geographic data may include a departure location and a destination location. In this implementation, a geofence activation condition may include that a departure location and a destination location be in differing geofenced areas. In routes where the licensing rights and other legal limitations do not change, there may be no need for a geofence monitor. The same content may be transmitted throughout the trip. In this instance, the determining entity may determine that the geofence activation condition is not satisfied. As such, the media content control operations of the geofence monitor 696 may be deactivated for the duration of the particular trip. Conversely, if the departure location and the destination location are in different geofenced areas, the determining entity may determine that the geofence activation condition is satisfied and may activate or cause activation of the media content control operations of the geofence monitor 696.

Alternative implementations are contemplated in which, even in situations where the trip is one in which legal and licensing rights do not change, the geofence monitor 696 is still activated and/or remains active at all times in which the transport craft is in transit. Further, the geofence activation condition may have a temporal element. For example, the transport craft may travel during more relaxed times for licensing. As such, the activation of the geofence monitor 696 may be dependent upon the time of day the trip occurs. In an implementation, the trip may occur over a duration over which temporal dimensions of the licensing scheme associated with media content changes. The geofence activation condition may be satisfied in such circumstances. Also, in another implementation, a detour may cause a redetermination of whether to activate the geofence monitor 696 because the transport craft will unexpectedly cross a geofence boundary based on the detour.

In an implementation, the on-board CMS (e.g., via one or more of the geofence monitor and a media control module) may transmit a modification to the media content to be provided by the on-board media system to a passenger/client device. This may be based on satisfaction of the geofence condition or an anticipated satisfaction of the condition (because a geofence boundary is being approached). The geofence monitor 696 of the on-board CMS may further transmit instructions to the on-board media system to notify a passenger/client device of the modification to the media content to be provided. For example, the notification may include an anticipated termination of media content being provided to the passenger/client device. In implementations in which the determining entity estimates a time in which the transport craft will cross a boundary of a geofence, the notification may include an estimated time until termination of the programming based on the estimated time of crossing.

In an implementation, geofence monitor 696 may modify media content to be provided by the on-board media system to the passenger/client devices in advance or in anticipation of crossing a geofence boundary. For example, the geofence condition may include the positional data representing a location of a transport craft satisfying a distance or timing condition relative to a geofence boundary. The distance condition may include that the positional data represents that the transport craft is within a predefined distance of a geofence boundary and/or that the vector on which the transport craft is traveling (or on an otherwise projected trajectory based on a route that may be other than linear) shows that the distance along the vector (or trajectory) from the transport craft to a geofence boundary is within a predefined distance. A timing condition can include that an estimated time of crossing one or more of a geofence or reduced geofence boundary is within a predefined time. Determining distances and times that satisfy these conditions can be different for aircraft than for land craft because altitude and curvature of the earth may be more significant factors for aircraft, and roads, road conditions, and surface conditions may be more significant for land craft. For aircraft, curvilinear trajectories may be more appropriate than linear ones. For land craft, trajectories may be based on the available roads or tracks and the artificial bends and turns of a road or a track. Distance and timing conditions may account for these factors when assessing vectors and/or trajectories.

In implementations in which a geofence includes a reduced geofence, when the transport craft approaches a boundary of the reduced geofenced area, the geofence monitor 696 may trigger a determination of an estimated crossing time and/or estimated time to crossing. The reduced geofence may thusly operate as a safeguard to ensure that media content provided when crossing the boundary of the geofenced area is authorized in a next geofenced area represented by a next geofence the geofenced area of which the transport craft will next enter.

Crossing timing may be determined and/or used by the geofence monitor 696 to trigger an action associated with a crossing or anticipated crossing of a geofence. In implementations, if the geofence monitor 696 determines or receives a determination that a predefined crossing timing condition is satisfied, a crossing preparation action may be taken. For example, the predefined crossing timing condition may include a time threshold representing a threshold estimated time until crossing a boundary of a geofenced area. This determination may be triggered by a crossing of a boundary of a reduced geofenced area or may be triggered by a determination of crossing time unrelated to a reduced geofence. The crossing preparation actions potentially triggered by satisfaction of the crossing timing condition may be taken by the geofence monitor 696 and may include one or more of preemptively modifying the content provided (e.g., to be consistent with limitations of a next geofence the next geofenced area of which the transport craft is about to enter), providing instructions to an on-board media system to modify the content provided (e.g., immediately or in a conservative estimated time that assures licenses or other legal restrictions are not violated), providing instructions to an on-board media system to notify a passenger/client device that media content may no longer be available, providing instructions to an on-board media system to notify a passenger/client device that media content may be available under different conditions, providing instructions to an on-board media system to notify a passenger/client device that media content may be available upon the on-board media system receiving approval of a condition from a passenger/client device (e.g., agreeing to provide payment for a media content offering the license of which requires different payment terms in a next geofenced area), providing instructions to prefetch new geofence data for a next geofence on a trajectory, and the like.

The media control module 697 is a hardware or software implemented logic element that manages media to be provided or permitted by the geofence monitor 696 of the on-board CMS. In various implementations, the media control module 697 is optional, a logic element independent of the geofence monitor 696, or an element of the geofence monitor. In an implementation, the on-board CMS (e.g., via one or more of the geofence monitor 696 and a media control module 697, depending on the implementation) may transmit a modification to the media content to be provided by the on-board media system to a passenger/client device. This may be based on satisfaction of the geofence condition or an anticipated satisfaction of the condition (because a geofence boundary is being approached). In an implementation, the media control module 697 one or more of has access to the media content, acts as a gateway to allow media content to be provided to an on-board media system, buffers media content, instructs on a consistent or intermittent basis which media content can be provided by the on-board media system to passenger/client devices, provides media content only to passenger/client devices that accept terms associated with the media content (e.g., based on satisfaction of a geofence condition), stores or provides prepositioned content, and the like.

Figure 7:
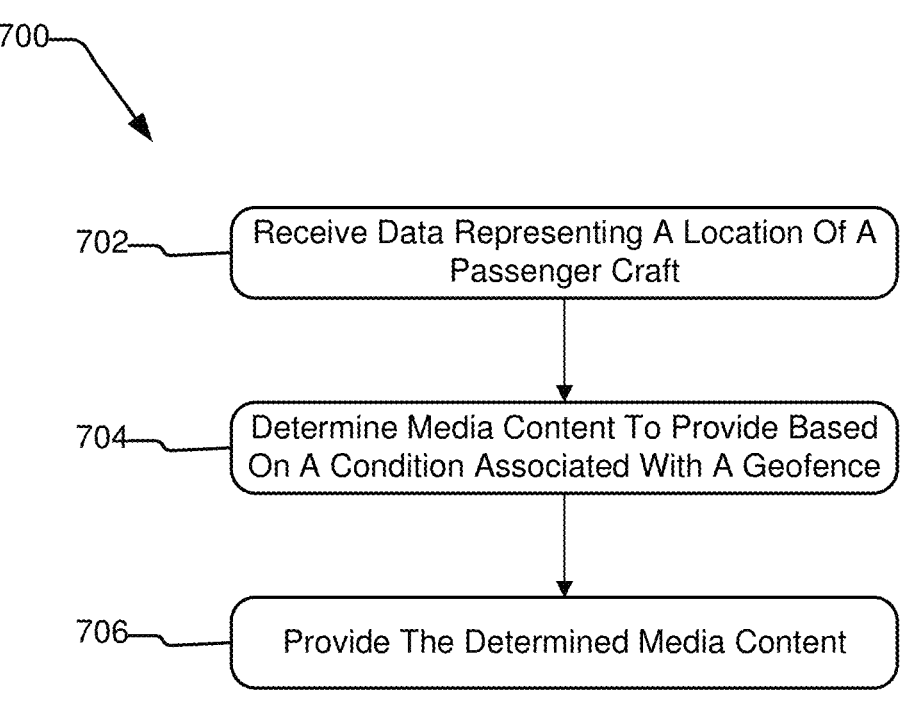
FIG. 7 illustrates an exemplary implementation of operations for providing media content in a transport craft.
Figure 8:
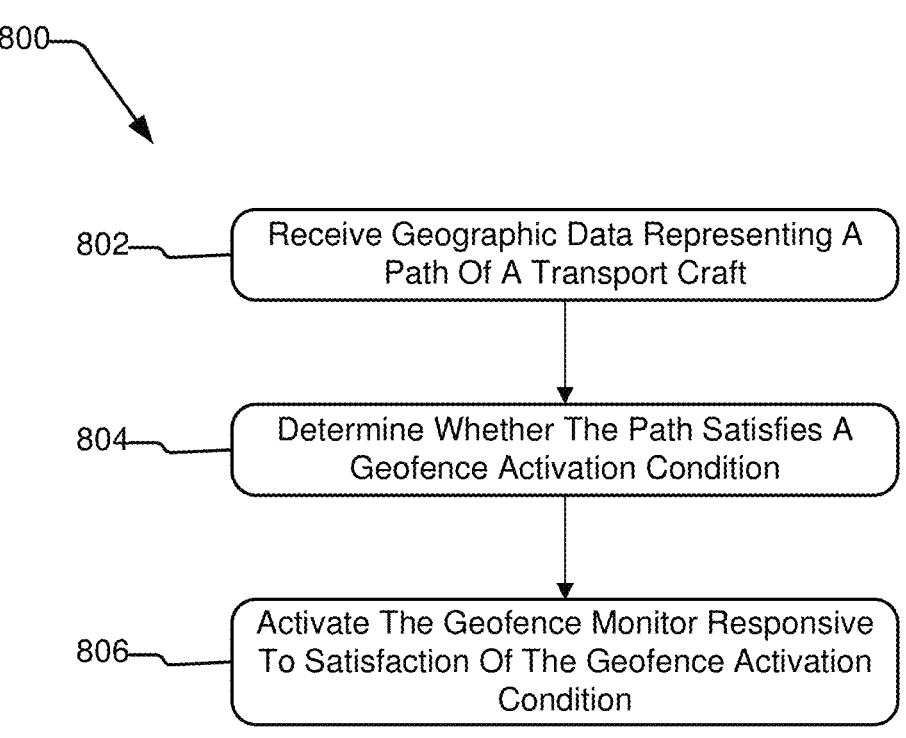
FIG. 8 illustrates an exemplary implementation of operations for activating a geofence monitor.
Figure 9:
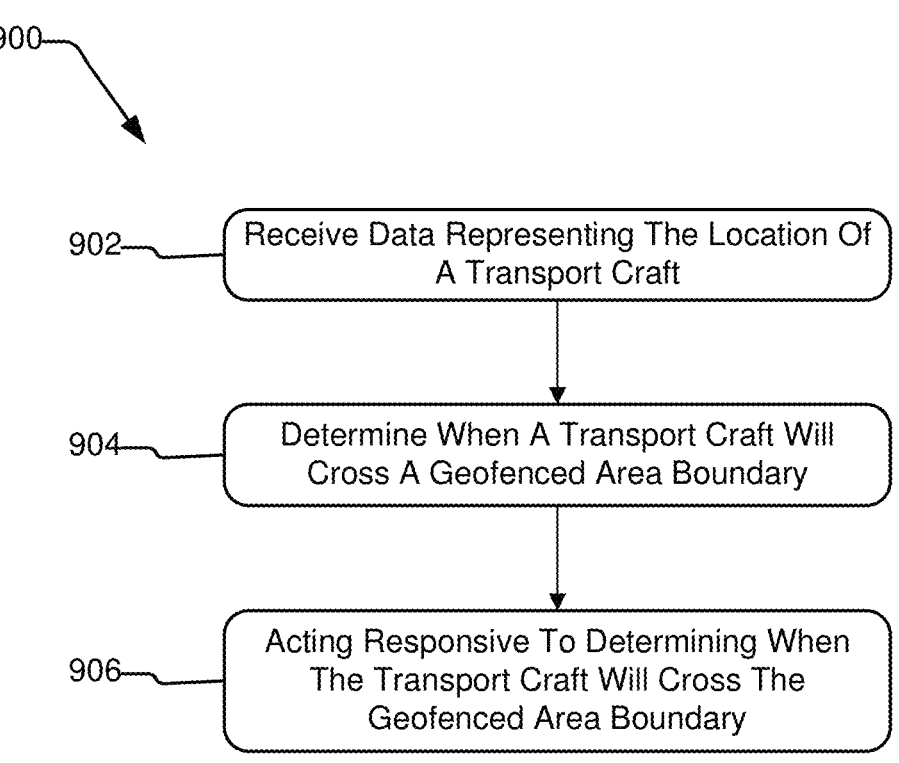
FIG. 9 illustrates an exemplary implementation of operations for anticipating a crossing of a geofence boundary.

FIGS. 7-9 illustrate various operations of a geofence system. The operations may be conducted by elements and in manners described elsewhere in the specification. For example, any on-board CMS, off-board CMS, on-board media system, geofence monitor, craft status monitor, conditions associated with a geofence, geofence, reduced geofence, positional data, transport craft, passenger/client device, location data module, media control module, computing system, processor, memory, and media described in descriptions of operations of FIGS. 7-9 may be implementations or any combination of implementations of the elements and manners of a same name described in systems 100-600 in FIGS. 1-6 and associated descriptions.

FIG. 7 illustrates an exemplary implementation of operations 700 for providing media content in a transport craft.

Receiving operation 702 receives data representing a location of a transport craft. The data representing a location of a transport craft (i.e., positional data) may include one or more of a current location of the transport craft 110, a vector or trajectory on which the transport craft 110 is traveling, data representing a path the transport craft 110 has already taken, a deviation from a predefined route, a velocity of the transport craft 110, an altitude of the transport craft 110, a temporal delay, a local traffic update, a longitude of the transport craft 110, a latitude of the transport craft 110, and the like.

The positional data may be received by one or more of an on-board CMS and an off-board CMS. In various implementations, the determinations of whether conditions associated with a geofence (e.g., geofences, geofence conditions, media content to be provided, geofence activation conditions, distance or timing conditions, licensing conditions, conditions under which media content is to be provided, modified conditions, crossing timing conditions, and passenger/client device conditions) are satisfied can be distributed in any manner between the on-board CMS and the off-board CMS.

In implementations in which the on-board CMS determines whether conditions associated with geofences and positional data are satisfied, the positional data may be received by a location data module of the on-board CMS from a craft status monitor. The location data module may perform operations on the positional data. In various implementations, the location data module may forward some or all of the positional data to one or more of the geofence monitor and the off-board CMS. The location data module may also reformat, remove, or otherwise filter some of the positional data before transmission for consumption by the recipient entity. In implementations, the location data module is an element of the geofence monitor that receives the locational data from a craft status monitor. In implementations, (e.g., implementations where the on-board CMS and craft status monitor are integrated) the receiving operation 702 may be omitted. Receiving operation 702 may occur prior to and/or during transit.

In implementations in which the off-board CMS determines whether conditions associated with geofences and positional data are satisfied, the positional data may be received by the off-board CMS from a craft status monitor (in some implementations, via the on-board CMS).

Determining operation 704 determines the media content to provide based on a condition associated with a geofence. In implementations in which the on-board CMS determines whether a geofence condition is satisfied, the geofence monitor of the on-board CMS may determine based on the positional data received from the craft status monitor and geofence data received from the off-board CMS whether the condition associated with the geofence is satisfied.

In implementations in which the on-board CMS determines media content an on-board media system may provide to passenger/client devices, the geofence monitor may store and/or receive data associated with a geofence (e.g., one or more of geofences, geofence conditions, media content to be provided, geofence activation conditions, distance or timing conditions, licensing conditions, conditions under which media content is to be provided, modified conditions, crossing timing conditions, and passenger/client device conditions provided by an off-board CMS) and positional data (e.g., positional data processed by the location data module).

In implementations in which the off-board CMS determines whether a condition associated with a geofence is satisfied, the off-board CMS determines whether the condition associated with a geofence is satisfied based on stored predefined geofence data and received positional data from the craft status monitor. The determination may then subsequently be transmitted to the geofence monitor of the on-board CMS.

In any implementation, the geofence monitor may control the media content to be provided based on positional data representing the location of a transport craft. The geofence monitor may determine changes to media content available and/or may modify the conditions under which the media content is available. For example, the geofence monitor, based on whether a geofence condition is satisfied, may determine one or more of which media content should be provided, modifications to media content already provided, conditions under which media content should be provided, instructions to transmit to an on-board media system regarding messages to provide to a passenger/client device regarding modifications to provided media content, instructions to an on-board media system regarding approvals for modified conditions the on-board media system is operable to obtain from a passenger/client device to continue providing media content, and the like. In implementations in which the off-board CMS determines whether the condition associated with the geofence is satisfied, the determining operations 704 may be limited to determining the media content to be provided from the perspective of the on-board CMS.

Providing operation 706 provides determined media content. Responsive to the geofence monitor determining the satisfaction of or receiving a determination regarding satisfaction of the condition associated with the geofence, the geofence monitor and/or a media control module may determine media content to provide or allow an on-board media system to provide to passenger/client devices based on the satisfaction determination.

In an implementation, the on-board CMS (e.g., via one or more of the geofence monitor and a media control module, depending on the implementation) may transmit instructions regarding media content or a modification to media content to be provided by the on-board media system to a passenger/client device. This may be based on satisfaction of the geofence condition or an anticipated satisfaction of the condition (because a geofence boundary is being approached). In an implementation, the media control module one or more of has access to the media content, acts as a gateway to allow media content to be provided to an on-board media system, buffers media content, instructs on a consistent or intermittent basis which media content can be provided by the on-board media system to passenger/client devices, provides media content only to passenger/client devices that accept terms associated with the media content (e.g., based on satisfaction of a geofence condition), stores or provides prepositioned content, and the like. Implementations are contemplated in which the media control module is an element of the geofence monitor.

FIG. 8 illustrates an exemplary implementation of operations 800 for activating a geofence monitor.

Receiving operation 802 receives geographic data representing a path of a transport craft. In implementations, the data representing the path of the transport craft includes predefined geographic data regarding the route or trajectory of the transport craft and can be transmitted to a determining entity. Depending on the implementation, the determining entity may include one or more of an off-board CMS and an on-board CMS (e.g., the geofence monitor can determine whether to activate its own functions for determining media content to be provided). In an implementation, the predefined geographic data may include a departure location and a destination location. In this implementation, a geofence activation condition may include that a departure location and a destination location be in differing geofenced areas. Other implementations of the predefined geographic representing a path may include one or more of a predefined route, a current trajectory, any detours or deviations from an expected route, a road map, a trail map, a flight path, a surface map (e.g., for off-road land vehicles), a train route, and the like. Receiving operation 802 may occur prior to and/or during transit.

Determining operation 804 determines whether the path satisfies a geofence activation condition. Determining operation 804 may be distributed between or facilitated by the on-board and the off-board CMS. One or more of the geofence monitor of the on-board CMS land the off-board CMS (e.g., the determining entity) may determine whether a geofence activation condition is satisfied. In trips where the licensing rights and other legal limitations do not change, there may be no need for a geofence monitor. The same content may be transmitted throughout the trip. In this instance, the determining entity may determine that the geofence activation condition is not satisfied. As such, the geofence monitor may be deactivated (e.g., with respect to its media content management function) for the duration of the particular trip. Conversely, if the departure location and the destination location are in different geofenced areas, the determining entity may determine that the geofence activation condition is satisfied and may activate or cause activation of the geofence monitor. In a specific implementation, the geofence activation condition may include whether a departure location and a destination location are located within different geofenced areas represented by different geofences (e.g., for specific media content). In this implementation, the geofence activation condition may be satisfied if the departure location and the destination location are located within the different geofenced areas. In this circumstance, the determining entity may determine that the geofence activation condition is satisfied.

In implementations, the geofence activation condition may have a temporal element. For example, the transport craft may travel during more relaxed times for licensing. As such, the activation of the geofence monitor may be dependent upon the time of day the trip occurs. In an implementation, the trip may occur over a duration over which temporal dimensions of the licensing scheme associated with media content change. Also, in another implementation, a detour may trigger a redetermination (e.g., based on a condition associated with a geofence) of whether to activate the geofence monitor because the transport craft will unexpectedly cross a geofence boundary based on the detour.

Activation operation 806 activates the geofence monitor responsive to satisfaction of the geofence activation condition. Activation operation 806 may be conducted by one or more of the on-board CMS, off-board CMS and the geofence monitor. The geofence monitor may "activate" itself by activating its monitoring and management functions that are responsive to satisfaction of conditions associated with the geofence and may otherwise be dormant except to determine whether to activate itself. The determining entity may but need not be the entity that activates the geofence monitor. For example, the off-board CMS may determine the geofence activation condition is satisfied, and one or more of the on-board CMS and the geofence monitor itself may activate the geofence monitor.

Alternative implementations are contemplated in which, even in situations where the trip is one in which legal and licensing rights do not change, the geofence monitor is still activated and/or remains active at all times in which the transport craft is in transit.

FIG. 9 illustrates an exemplary implementation of operations 900 for anticipating a crossing of a geofence boundary. Receiving operation 902 receives data representing the location of a transport craft. The data representing the location of the transport craft may include positional data. The data representing the location of the transport craft may be received by a determining entity configured to determine the timing of a crossing of a transport craft, the determining entity being one or more of an on-board CMS, a geofence monitor of an on-board CMS, and an off-board CMS.

Determining operation 904 determines when a transport craft will cross a geofenced area boundary. The crossing timing may be estimated based on one or more of geofence data that represents geofence, geofence data representing the next geofence, positional data, externally provided navigation data (e.g., GPS data), and the like. In an implementation, the positional data includes a trajectory (e.g., a transit vector) of the transport craft. Based on the speed and direction of the transport craft and/or a predefined distance or time to a boundary of the geofenced area, the determining entity may determine the estimated crossing timing. In the context of an aircraft, the timing of crossing may be predefined based on the location of the craft and historical flight data for flights using a same or similar flight path. In the context of a road vehicle, the estimated timing may be based on historical route timing, perhaps accounting for the nature of roads and traffic.

In implementations in which a geofence includes a reduced geofence, the reduced geofence can be used to estimate the time the transport craft will cross a geofence. For example, when the transport craft approaches a boundary of the reduced geofenced area, a geofence monitor of an on-board CMS may trigger a determination of an estimated crossing time and/or estimated time to crossing. The reduced geofence may thusly operate as a safeguard to assure that media content provided when crossing the boundary of the geofenced area is authorized in a next geofenced area represented by a next geofence.

Acting operation 906 takes an action responsive to determining when the transport craft will cross the geofenced area boundary. The acting operation 906 may involve one or more of an on-board CMS, geofence monitor, and off-board CMS triggering an action associated with a crossing or anticipated crossing of a geofence. In implementations, if a certain predefined crossing timing condition is satisfied, a crossing preparation action may be taken. For example, the predefined crossing timing condition may include a time threshold representing a threshold estimated time until crossing a boundary of a geofenced area. This determination may be triggered by a crossing of a boundary of a reduced geofenced area or may be triggered by a determination of crossing time unrelated to a reduced geofence. The crossing preparation actions potentially triggered by satisfaction of the crossing timing condition may be taken by a geofence monitor and may include one or more of preemptively modifying the content provided (e.g., to be consistent with limitations of a next geofence the next geofenced area of which the transport craft is about to enter), providing instructions to an on-board media system to modify the content provided (e.g., immediately or in a conservative estimated time that assures licenses or other legal restrictions are not violated), providing instructions to an on-board media system to notify a passenger/client device that media content may no longer be available, providing instructions to an on-board media system to notify a passenger/client device that media content may be available under different conditions, providing instructions to an on-board media system to notify a passenger/client device that media content may be available upon the on-board media system receiving approval of a condition from a passenger/client device (e.g., agreeing to provide payment for a media content offering the license of which requires different payment terms in a next geofenced area), providing instructions to prefetch new geofence data for a next geofence on a trajectory, and the like.

Each of FIGS. 7-9 illustrate exemplary implementations of operations. Each operation 702-706, 802-806, and 902-906 may be conducted in any order unless indicated otherwise. In implementations, the operations 702-706, 802-806, and 902-906 may not be distinct operations but elements of a larger operation. In implementations, the operations 702-706, 802-806, and 902-906 may each have other steps in addition to or instead of those described. Subsets of the operations 702-706, 802-806, and 902-906 may be used to form their own method. The operations 702-706, 802-806, and 902-906 may be repeated any number of times, may be conducted periodically, may be conducted responsively to actions described in this specification, or may be continuously or selectively looped.

Figure 10:
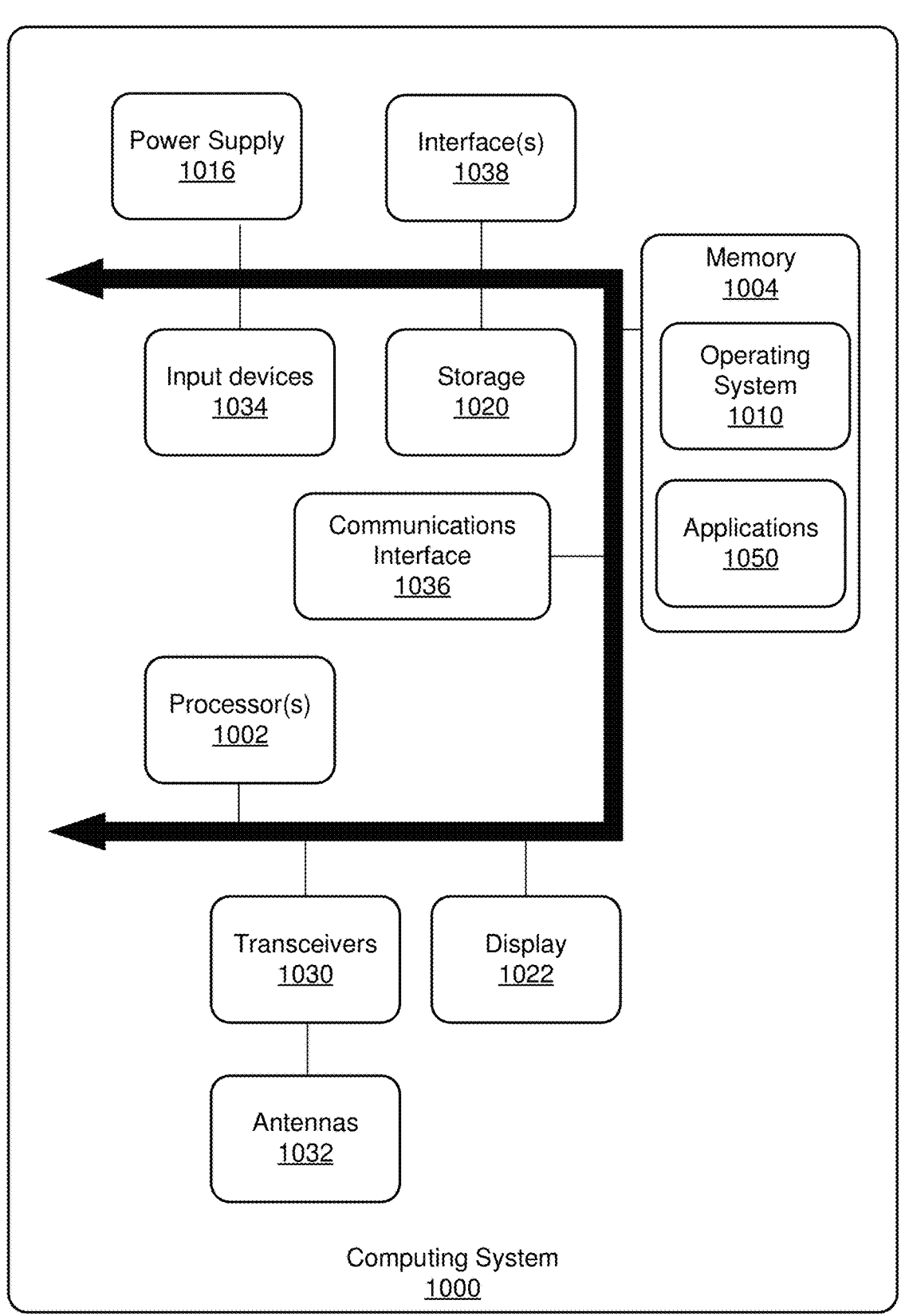
FIG. 10 illustrates an exemplary implementation of a computing system.

FIG. 10 illustrates an exemplary implementation of a computing system 1000 for implementing the features and operations of the described technology. The computing system 1000 may embody a remote-control device or a physical controlled device and is an example network-connected and/or network-capable device and may be a passenger/client device, such as a laptop, mobile device, desktop, tablet; a server/cloud device; an internet-of-things device; an electronic accessory; or another electronic device. The computing system 1000 includes one or more processor(s) 1002 and a memory 1004. The memory 1004 generally includes both volatile memory (e.g., RAM) and nonvolatile memory (e.g., flash memory). An operating system 1010 resides in the memory 1004 and is executed by the processor(s) 1002. The computing system 1000 may be an implementation of one or more of an off-board CMS, on-board systems, an on-board CMS, a geofence monitor, a network access unit, a WAP, an on-board media system, a craft status monitor, a passenger/client device, an off-board communication network, and any of systems 100-600.

In an example computing system 1000, as shown in FIG. 10, one or more modules or segments, such as applications 1050, an on-board CMS, an off-board CMS, a geofence monitor, a location data module, a media control module, an-onboard media system, and a craft status monitor are loaded into the operating system 1010 on the memory 1004 and/or storage 1020 and executed by processor(s) 1002. The storage 1020 may include one or more tangible storage media devices and may store one or more of positional data (e.g., one or more of a current location of the transport craft and data representing one or more of a vector or trajectory on which the transport craft is traveling, a path the transport craft has already taken, a deviation from a predefined route, a velocity of the transport craft, an altitude of the transport craft, a temporal delay, a traffic update, a longitude of the transport craft, a latitude of the transport craft), a predefined rule, media content, an association between media content and geofence data, geofence data, reduced geofence data, a geofenced area, a reduced geofenced area, a geofence condition, a geofence boundary, a reduced geofence boundary, a geofence activation condition, a distance condition, a timing condition, a passenger/client device condition, a crossing timing condition, a geofence point, a point of longitude, a point of latitude, a geographic coordinate, a set of tuples or a tuple of geographic coordinates, a channel, a plurality of media contents, live content, first run content, re-run content, prepositioned content, an IPTV stream, a geographic location, an anticipated trajectory, a departure time, an arrival time, a transit time, temporal dimensions of a geofence, a predefined update frequency, geofence metadata, media content metadata, a time of or to crossing, a deviation from an expected time of or to crossing, predefined a route taken, a deviation from an expected trajectory, a weather condition near a transport craft, a detour, a notification, a predefined distance, a fee, a modified condition, a content parameter, a content type, a broadcasting time slot, a linear channel schedule, a media content restriction, a piecewise function, a continuous function, a historically used path or route, a speed of a transit craft, an orientation of a transit craft, historical flight data, a road, a road map, a trail map, a flight path, a surface map (e.g., for off-road land vehicles), a train route, a payment term, locally and globally unique identifiers, requests, responses, and other data and be local to the computing system 1000 or may be remote and communicatively connected to the computing system 1000.

The computing system 1000 includes a power supply 1016, which is powered by one or more batteries or other power sources and which provides power to other components of the computing system 1000. The power supply 1016 may also be connected to an external power source that overrides or recharges the built-in batteries or other power sources.

The computing system 1000 may include one or more communication transceivers 1030, which may be connected to one or more antenna(s) 1032 to provide network connectivity (e.g., mobile phone network, Wi-Fi®, Bluetooth®) to one or more other servers and/or passenger/client devices (e.g., mobile devices, desktop computers, or laptop computers). The computing system 1000 may further include a network adapter 1036, which is a type of computing system. The computing system 1000 may use the adapter and any other types of computing systems for establishing connections over a wide-area network (WAN) or local-area network (LAN). It should be appreciated that the network connections shown are examples and that other computing systems and means for establishing a communications link between the computing system 1000 and other devices may be used.

The computing system 1000 may include one or more input devices 1034 such that a user may enter commands and information (e.g., a keyboard or mouse). These and other input devices may be coupled to the server by one or more interfaces 1038, such as a serial port interface, parallel port, or universal serial bus (USB). The computing system 1000 may further include a display 1022, such as a touch screen display.

The computing system 1000 may include a variety of tangible processor-readable storage media and intangible processor-readable communication signals. Tangible processor-readable storage can be embodied by any available media that can be accessed by the computing system 1000 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing system 1000. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing systems.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method of controlling media content provided to an on-board media system in a transport craft is provided. The method includes receiving data representing a location of the transport craft from a location system of the transport craft and providing, by an on-board content management system including a geofence monitor, the media content. The providing includes determining the media content the on-board media system provides based on a determination of whether the transport craft satisfies a geofence condition, the satisfaction of the geofence condition based on the received data representing the location of the transport craft and instructing the on-board media system to provide determined media content.

Another example method of any preceding method is provided, the method further including receiving predefined geographic data representing a path the transport craft will take, determining whether the predefined geographic data satisfies a geofence activation condition, and activating the geofence monitor responsive to satisfaction of the geofence activation condition, wherein the operation of providing is responsive to the operation of activating.

Another example method of any preceding method is provided, wherein the predefined geographic data representing the path includes an origin and a destination of the path the transport craft will take.

Another example method of any preceding method is provided, wherein the geofence activation condition includes whether both an origin and a destination of the transport craft are located within a same geofenced area.

Another example method of any preceding method is provided, the method further including receiving data representing a geofenced area and determining, based on the received data representing the location and the received data representing the geofenced area, whether the geofence condition is satisfied, wherein the operation of determining whether the geofence condition is satisfied is conducted by the on-board content management system.

Another example method of any preceding method is provided, wherein the operation of receiving data representing a geofenced area is conducted at a predefined frequency.

Another example method of any preceding method is provided, wherein the predefined frequency is dynamic and based on the represented location and the data representing the geofenced area.

Another example method of any preceding method is provided, wherein the predefined frequency increases as a geographical distance between the represented location and a geofence boundary represented in the data representing the geofenced area decreases.

Another example method of any preceding method is provided, wherein the data representing the geofenced area includes tuples of points, each of the tuples of points including at least one longitude and at least one latitude, the tuples of points at least partially defining a boundary of the geofenced area.

Another example method of any preceding method is provided, the method further including receiving data representing a reduced geofenced area within the geofenced area and estimating, based on the data representing the reduced geofenced area, when the transport craft will cross a boundary of the geofenced area.

Another example method of any preceding method is provided, the method further including estimating, based on a transit vector of the transport craft included in the received data representing a location of the craft, when the transport craft will cross a boundary of the geofenced area.

Another example method of any preceding method is provided, the method further including transmitting the received data representing the location to an off-board content management system, wherein the off-board content management system is communicatively coupled to the on-board content management system via an off-board communication network and receiving, from the off-board content management system, a determination of whether the geofence condition is satisfied.

Another example method of any preceding method is provided, wherein the operation of receiving the determination of whether the geofence condition is satisfied is conducted at a predefined frequency.

Another example method of any preceding method is provided, wherein the predefined frequency is dynamic based on the represented location and data representing a geofenced area.

Another example method of any preceding method is provided, wherein the predefined frequency increases as a geographical distance between the represented location and a geofence boundary decreases.

Another example method of any preceding method is provided, the method further including receiving an estimated time the transport craft will cross a boundary of a geofenced area based on data representing a reduced geofenced area within the geofenced area.

Another example method of any preceding method is provided, wherein the geofence condition is specifically associated with the media content.

Another example method of any preceding method is provided, wherein the geofence condition includes data that associates the geofence condition with the media content.

Another example method of any preceding method is provided, wherein the media content is one of a plurality of media contents and the geofence condition is one of a plurality of geofence conditions, the operation of providing further including providing the media content under different conditions from other media content of the plurality of media contents, based on the specific association.

Another example method of any preceding method is provided, the operation of providing further including transmitting a modified condition for providing the media content to the on-board media system and transmitting instructions to the on-board media system to request a client device to provide data representing acceptance of the modified condition for providing the media content.

Another example method of any preceding method is provided, the operation of providing further comprising transmitting a modification to the media content provided and transmitting instructions to the on-board media system to notify a client device of the modification to the media content provided.

Another example method of any preceding method is provided, wherein the media content includes substantially live transmitted media content.

Another example method of any preceding method is provided, wherein the received data representing a location includes one or more of a current location of the transport craft, a vector at which the craft is traveling, data representing a path the transport craft has already taken, a deviation from a predefined route, a velocity of the transport craft, an altitude of the transport craft, a temporal delay, a traffic update, a longitude of the transport craft, and a latitude of the transport craft.

Another example method of any preceding method is provided, wherein the satisfaction of the geofence condition includes a determination that the represented location is within boundaries of a geofence.

An example system for controlling media content provided to an on-board media system in a transport craft is provided. The system includes an on-board content management system located on the transport craft, the on-board content management system communicatively coupled with the on-board media system, the on-board content management system. The on-board content management system includes a location data module executable by a processor and operable to receive data representing a location of the transport craft from a location system of the transport craft, a geofence monitor executable by the processor and operable to determine the media content the on-board media system may provide based on a determination of whether the transport craft satisfies a geofence condition, the satisfaction of the geofence condition based on the received data representing the location of the transport craft, and a media control module executable by the processor and operable to instruct the on-board media system to provide the determined media content.

Another example system of any preceding system is provided, wherein the geofence monitor is further operable to receive predefined geographic data representing a path the transport craft will take, determine whether the predefined geographic data satisfies a geofence activation condition, and activate the geofence monitor responsive to satisfaction of the geofence activation condition, wherein the provision of the content is responsive to the activation.

Another example system of any preceding system is provided, wherein the predefined geographic data representing the path includes an origin and a destination of the path the transport craft will take.

Another example system of any preceding system is provided, wherein the geofence activation condition includes whether both an origin and a destination of the transport craft are located within a same geofenced area.

Another example system of any preceding system is provided, wherein the geofence monitor is further operable to receive data representing a geofenced area and determine, based on the received data representing the location and the received data representing the geofenced area, whether the geofence condition is satisfied, wherein the determination of whether the geofence condition is satisfied is conducted by the on-board content management system.

Another example system of any preceding system is provided, wherein geofence monitor receives the data representing a geofenced area at a predefined frequency.

Another example system of any preceding system is provided, wherein the predefined frequency is dynamic and based on the represented location and the data representing the geofenced area.

Another example system of any preceding system is provided, wherein the predefined frequency increases as a geographical distance between the represented location and a geofence boundary represented in the data representing the geofenced area decreases.

Another example system of any preceding system is provided, wherein the data representing the geofenced area includes tuples of points, each of the tuples of points including at least one longitude and at least one latitude, the tuples of points at least partially defining a boundary of the geofenced area.

Another example system of any preceding system is provided, wherein the geofence monitor is further operable to receive data representing a reduced geofenced area within the geofenced area and estimate, based on the data representing the reduced geofenced area, when the transport craft will cross a boundary of the geofenced area.

Another example system of any preceding system is provided, wherein the geofence monitor is further operable to estimate, based on a transit vector of the transport craft included in the received data representing a location of the craft when the transport craft will cross a boundary of the geofenced area.

Another example system of any preceding system is provided, the system further including an off-board communication network and an off-board content management system remote from the transport craft and communicatively coupled to the on-board content management system via the off-board communication network. The geofence monitor is further operable to transmit the received data representing the location to the off-board content management system and receive, from the off-board content management system, a determination of whether the geofence condition is satisfied.

Another example system of any preceding system is provided, wherein the geofence monitor is further operable to receive the determination of whether the geofence condition is satisfied at a predefined frequency.

Another example system of any preceding system is provided, wherein the predefined frequency is dynamic and based on the represented location and data representing a geofenced area.

Another example system of any preceding system is provided, wherein the predefined frequency increases as a geographical distance between the represented location and a geofence boundary decreases.

Another example system of any preceding system is provided, wherein the geofence monitor further operable to receive an estimated time the transport craft will cross a boundary of the geofenced area based on data representing a reduced geofenced area within a geofenced area.

Another example system of any preceding system is provided, wherein the geofence condition is specifically associated with the media content.

Another example system of any preceding system is provided, wherein data representing the geofence condition includes data that associates the geofence condition with the media content.

Another example system of any preceding system is provided, wherein the media content is one of a plurality of media contents and the geofence condition is one of a plurality of geofence conditions, the media control module further operable to provide the media content under different conditions from other media content of the plurality of media contents, based on the specific association.

Another example system of any preceding system is provided, wherein the media control module is further operable to transmit a modified condition for providing the media content to the on-board media system and transmit instructions to the on-board media system to request a client device to provide data representing acceptance of the modified condition for providing the media content.

Another example system of any preceding system is provided, wherein the media control module is further operable to transmit a modification to the media content provided and transmit instructions to the on-board media system to notify a client device of the modification to the media content provided.

Another example system of any preceding system is provided, wherein the media content includes substantially live transmitted media content.

Another example system of any preceding system is provided, wherein the received data representing a location includes one or more of a current location of the transport craft, a vector at which the craft is traveling, data representing a path the transport craft has already taken, a deviation from a predefined route, a velocity of the transport craft, an altitude of the transport craft, a temporal delay, a traffic update, a longitude of the transport craft, and a latitude of the transport craft.

Another example system of any preceding system is provided, wherein the satisfaction of the geofence condition includes a determination that the represented location is within boundaries of a geofence.

An example system of controlling media content provided to an on-board media system in a transport craft is provided. The system includes means for receiving data representing a location of the transport craft from a location system of the transport craft and means for providing, by an on-board content management system including a geofence monitor, the media content. The means for providing includes means for determining the media content the on-board media system provides based on a determination of whether the transport craft satisfies a geofence condition, the satisfaction of the geofence condition based on the received data representing the location of the transport craft, and means for instructing the on-board media system to provide determined media content.

Another example system of any preceding system is provided, the system further including means for receiving predefined geographic data representing a path the transport craft will take, means for determining whether the predefined geographic data satisfies a geofence activation condition, and means for activating the geofence monitor responsive to satisfaction of the geofence activation condition, wherein the providing is responsive to the activation.

Another example system of any preceding system is provided, wherein the predefined geographic data representing the path includes an origin and a destination of the path the transport craft will take.

Another example system of any preceding system is provided, wherein the geofence activation condition includes whether both an origin and a destination of the transport craft are located within a same geofenced area.

Another example system of any preceding system is provided, the system further including means for receiving data representing a geofenced area and means for determining, based on the received data representing the location and the received data representing the geofenced area, whether the geofence condition is satisfied, wherein the determination of whether the geofence condition is satisfied is conducted by the on-board content management system.

Another example system of any preceding system is provided, wherein the receipt of data representing a geofenced area is conducted at a predefined frequency.

Another example system of any preceding system is provided, wherein the predefined frequency is dynamic and based on the represented location and the data representing the geofenced area.

Another example system of any preceding system is provided, wherein the predefined frequency increases as a geographical distance between the represented location and a geofence boundary represented in the data representing the geofenced area decreases.

Another example system of any preceding system is provided, wherein the data representing the geofenced area includes tuples of points, each of the tuples of points including at least one longitude and at least one latitude, the tuples of points at least partially defining a boundary of the geofenced area.

Another example system of any preceding system is provided, the system further including means for receiving data representing a reduced geofenced area within the geofenced area and means for estimating, based on the data representing the reduced geofenced area, when the transport craft will cross a boundary of the geofenced area.

Another example system of any preceding system is provided, the system further including means for estimating, based on a transit vector of the transport craft included in the received data representing a location of the craft, when the transport craft will cross a boundary of the geofenced area.

Another example system of any preceding system is provided, the system further including means for transmitting the received data representing the location to an off-board content management system, wherein the off-board content management system is communicatively coupled to the on-board content management system via an off-board communication network and means for receiving, from the off-board content management system, a determination of whether the geofence condition is satisfied.

Another example system of any preceding system is provided, wherein the receipt of the determination of whether the geofence condition is satisfied is conducted at a predefined frequency.

Another example system of any preceding system is provided, wherein the predefined frequency is dynamic based on the represented location and data representing a geofenced area.

Another example system of any preceding system is provided, wherein the predefined frequency increases as a geographical distance between the represented location and a geofence boundary decreases.

Another example system of any preceding system is provided, the system further including means for receiving an estimated time the transport craft will cross a boundary of a geofenced area based on data representing a reduced geofenced area within the geofenced area.

Another example system of any preceding system is provided, wherein the geofence condition is specifically associated with the media content.

Another example system of any preceding system is provided, wherein the geofence condition includes data that associates the geofence condition with the media content.

Another example system of any preceding system is provided, wherein the media content is one of a plurality of media contents and the geofence condition is one of a plurality of geofence conditions, the means for providing further including means for providing the media content under different conditions from other media content of the plurality of media contents, based on the specific association.

Another example system of any preceding system is provided, the means for providing further including means for transmitting a modified condition for providing the media content to the on-board media system and means for transmitting instructions to the on-board media system to request a client device to provide data representing acceptance of the modified condition for providing the media content.

Another example system of any preceding system is provided, the means for providing further including means for transmitting a modification to the media content provided and means for transmitting instructions to the on-board media system to notify a client device of the modification to the media content provided.

Another example system of any preceding system is provided, wherein the media content includes substantially live transmitted media content.

Another example system of any preceding system is provided, wherein the received data representing a location includes one or more of a current location of the transport craft, a vector at which the craft is traveling, data representing a path the transport craft has already taken, a deviation from a predefined route, a velocity of the transport craft, an altitude of the transport craft, a temporal delay, a traffic update, a longitude of the transport craft, and a latitude of the transport craft.

Another example system of any preceding system is provided, wherein the satisfaction of the geofence condition includes a determination that the represented location is within boundaries of a geofence.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of controlling media content provided to an on-board media system in a transport craft for distribution to a plurality of client devices aboard the transport craft, comprising:

receiving data representing a location of the transport craft from a location system of the transport craft;

providing, by an on-board content management system including a geofence monitor, the media content for distribution to the plurality of client devices aboard the transport craft, the providing including:

determining the media content the on-board media system provides for distribution to the plurality of client devices aboard the transport craft based on a determination of whether the transport craft satisfies a geofence condition, wherein satisfaction of the geofence condition is based on the received data representing the location of the transport craft; and instructing the on-board media system to provide determined media content for distribution to the plurality of client devices aboard the transport craft;

receiving predefined geographic data representing a path the transport craft will take;

determining whether the predefined geographic data satisfies a geofence activation condition; and activating the geofence monitor responsive to satisfaction of the geofence activation condition, wherein the operation of providing is responsive to the operation of activating.

2. The method of claim 1, wherein the predefined geographic data representing the path includes an origin and a destination of the path the transport craft will take.

3. The method of claim 1, wherein the geofence activation condition includes whether both an origin and a destination of the transport craft are located within a same geofenced area.

4. The method of claim 1, further comprising:

receiving data representing a geofenced area; and determining, based on the received data representing the location and the received data representing the geofenced area, whether the geofence condition is satisfied, wherein the operation of determining whether the geofence condition is satisfied is conducted by the on-board content management system.

5. The method of claim 1, wherein the operation of receiving data representing a geofenced area is conducted at a predefined frequency.

6. The method of claim 5, wherein the predefined frequency is dynamic and based on the represented location and the data representing the geofenced area.

7. The method of claim 5, wherein the predefined frequency increases as a geographical distance between the represented location and a geofence boundary represented in the data representing the geofenced area decreases.

8. The method of claim 4 wherein the data representing the geofenced area includes tuples of points, each of the tuples of points including at least one longitude and at least one latitude, the tuples of points at least partially defining a boundary of the geofenced area.

9. The method of claim 4, further comprising:

receiving data representing a reduced geofenced area within the geofenced area; and estimating, based on the data representing the reduced geofenced area, when the transport craft will cross a boundary of the geofenced area.

10. The method of claim 4, further comprising:

estimating, based on a transit vector of the transport craft included in the received data representing a location of the transport craft, when the transport craft will cross a boundary of the geofenced area.

11. The method of claim 1, further comprising:

transmitting the received data representing the location to an off-board content management system, wherein the off-board content management system is communicatively coupled to the on-board content management system via an off-board communication network; and receiving, from the off-board content management system, a determination of whether the geofence condition is satisfied.

12. The method of claim 1, wherein the operation of receiving the determination of whether the geofence condition is satisfied is conducted at a predefined frequency.

13. The method of claim 12, wherein the predefined frequency is dynamic based on the represented location and data representing a geofenced area.

14. The method of claim 12, wherein the predefined frequency increases as a geographical distance between the represented location and a geofence boundary decreases.

15. The method of claim 1, further comprising:

receiving an estimated time the transport craft will cross a boundary of a geofenced area based on data representing a reduced geofenced area within the geofenced area.

16. The method of claim 1, wherein the geofence condition is specifically associated with the media content.

17. The method of claim 16, wherein the geofence condition includes data that associates the geofence condition with the media content.

18. The method of claim 17, wherein the media content is one of a plurality of media contents and the geofence condition is one of a plurality of geofence conditions, the operation of providing further comprising:

providing the media content under different conditions from other media content of the plurality of media contents, based on the specific association.

19. The method of claim 1, the operation of providing further comprising:

transmitting a modified condition for providing the media content to the on-board media system; and transmitting instructions to the on-board media system to request a client device to provide data representing acceptance of the modified condition for providing the media content.

20. The method of claim 1, the operation of providing further comprising:

transmitting a modification to the media content provided; and transmitting instructions to the on-board media system to notify a client device of the modification to the media content provided.

21. The method of claim 1, wherein the media content includes substantially live transmitted media content.

22. The method of claim 1, wherein the received data representing a location includes one or more of a current location of the transport craft, a vector at which the transport craft is traveling, data representing a path the transport craft has already taken, a deviation from a predefined route, a velocity of the transport craft, an altitude of the transport craft, a temporal delay, a traffic update, a longitude of the transport craft, and a latitude of the transport craft.

23. The method of claim 1, wherein the satisfaction of the geofence condition includes a determination that the represented location is within boundaries of a geofence.

24. A system for controlling media content provided to an on-board media system in a transport craft for distribution to a plurality of client devices aboard the transport craft, comprising:

an on-board content management system located on the transport craft, the on-board content management system communicatively coupled with the on-board media system, the on-board content management system including:

a location data module executable by a processor and operable to receive data representing a location of the transport craft from a location system of the transport craft;

a geofence monitor executable by the processor and operable to determine the media content the on-board media system may provide for distribution to a plurality of client devices aboard the transport craft based on a determination of whether the transport craft satisfies a geofence condition, wherein satisfaction of the geofence condition is based on the received data representing the location of the transport craft, the geofence monitor further operable to:

receive predefined geographic data representing a path the transport craft will take;

determine whether the predefined geographic data satisfies a geofence activation condition; and activate the geofence monitor responsive to satisfaction of the geofence activation condition, wherein the provision of the determined content is responsive to the activation; and a media control module executable by the processor and operable to instruct the on-board media system (500150) to provide the determined media content for distribution to a plurality of client devices aboard the transport craft.

25. The system of claim 24, wherein the predefined geographic data representing the path includes an origin and a destination of the path the transport craft will take.

26. The system of claim 24, wherein the geofence activation condition includes whether both an origin and a destination of the transport craft are located within a same geofenced area.

27. The system of claim 24, the geofence monitor further operable to:

receive data representing a geofenced area; and determine, based on the received data representing the location and the received data representing the geofenced area, whether the geofence condition is satisfied, wherein the determination of whether the geofence condition is satisfied is conducted by the on-board content management system.

28. The system of claim 27, wherein geofence monitor receives the data representing the geofenced area at a predefined frequency.

29. The system of claim 28, wherein the predefined frequency is dynamic and based on the represented location and the data representing the geofenced area.

30. The system of claim 28, wherein the predefined frequency increases as a geographical distance between the represented location and a geofence boundary represented in the data representing the geofenced area decreases.

31. The system of claim 27, wherein the data representing the geofenced area includes tuples of points, each of the tuples of points including at least one longitude and at least one latitude, the tuples of points at least partially defining a boundary of the geofenced area.

32. The system of claim 24, the geofence monitor further operable to:

receive data representing a reduced geofenced area within the geofenced area; and estimate, based on the data representing the reduced geofenced area, when the transport craft will cross a boundary of the geofenced area.

33. The system of claim 32, the geofence monitor further operable to:

estimate, based on a transit vector of the transport craft included in the received data representing a location of the transport craft when the transport craft will cross a boundary of the geofenced area.

34. The system of claim 24, further comprising:

an off-board communication network; and an off-board content management system remote from the transport craft and communicatively coupled to the on-board content management system via the off-board communication network, wherein the geofence monitor is further operable to:

transmit the received data representing the location to the off-board content management system; and receive, from the off-board content management system, a determination of whether the geofence condition is satisfied.

35. The system of claim 24, wherein the geofence monitor is further operable to receive the determination of whether the geofence condition is satisfied at a predefined frequency.

36. The system of claim 35, wherein the predefined frequency is dynamic and based on the represented location and data representing a geofenced area.

37. The system of claim 35, wherein the predefined frequency increases as a geographical distance between the represented location and a geofence boundary decreases.

38. The system of claim 32, the geofence monitor further operable to receive an estimated time the transport craft will cross a boundary of the geofenced area based on data representing a reduced geofenced area within a geofenced area.

39. The system of claim 24, wherein the geofence condition is specifically associated with the media content.

40. The system of claim 39, wherein data representing the geofence condition includes data that associates the geofence condition with the media content.

41. The system of claim 40, wherein the media content is one of a plurality of media contents and the geofence condition is one of a plurality of geofence conditions, the media control module further operable to provide the media content under different conditions from other media content of the plurality of media contents, based on the specific association.

42. The system of claim 24, the media control module further operable to:

transmit a modified condition for providing the media content to the on-board media system; and transmit instructions to the on-board media system to request a client device to provide data representing acceptance of the modified condition for providing the media content.

43. The system of claim 24, the media control module further operable to:

transmit a modification to the media content provided; and transmit instructions to the on-board media system to notify a client device of the modification to the media content provided.

44. The system of claim 24, wherein the media content includes substantially live transmitted media content.

45. The system of claim 24, wherein the received data representing a location includes one or more of a current location of the transport craft, a vector at which the transport craft is traveling, data representing a path the transport craft has already taken, a deviation from a predefined route, a velocity of the transport craft, an altitude of the transport craft, a temporal delay, a traffic update, a longitude of the transport craft, and a latitude of the transport craft.

46. The system of claim 24, wherein the satisfaction of the geofence condition includes a determination that the represented location is within boundaries of a geofence.

* * * * *